United States Patent
Nam et al.

(10) Patent No.: US 12,250,539 B2
(45) Date of Patent: Mar. 11, 2025

(54) METHOD AND DEVICE FOR AUTHENTICATING DEVICE USING WIRELESS LAN SERVICE

(71) Applicant: Samsung Electronics Co., Ltd., Suwon-si (KR)

(72) Inventors: Hyeongmin Nam, Suwon-si (KR); Yeonchul Shin, Suwon-si (KR); Seyoung Jang, Suwon-si (KR); Inkook Chang, Suwon-si (KR); Joonsung Chun, Suwon-si (KR); Chulhoon Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 885 days.

(21) Appl. No.: 16/981,477

(22) PCT Filed: Mar. 20, 2019

(86) PCT No.: PCT/KR2019/003222
§ 371 (c)(1),
(2) Date: Sep. 16, 2020

(87) PCT Pub. No.: WO2019/182342
PCT Pub. Date: Sep. 26, 2019

(65) Prior Publication Data
US 2021/0029543 A1   Jan. 28, 2021

(30) Foreign Application Priority Data
Mar. 21, 2018 (KR) .................. 10-2018-0032905

(51) Int. Cl.
*H04W 12/06* (2021.01)
*H04B 17/318* (2015.01)
(Continued)

(52) U.S. Cl.
CPC .......... *H04W 12/06* (2013.01); *H04B 17/318* (2015.01); *H04L 43/028* (2013.01); *H04W 76/10* (2018.02); *H04W 84/12* (2013.01)

(58) Field of Classification Search
CPC ..... H04W 12/06; H04W 76/10; H04W 84/12; H04W 12/069; H04W 12/088;
(Continued)

(56) References Cited

U.S. PATENT DOCUMENTS 6,836,807 B2 * 12/2004 Wu ................ G06F 3/03543
446/175
7,555,783 B2 * 6/2009 Enright ............. H04L 63/083
713/168
(Continued)

FOREIGN PATENT DOCUMENTS

CN   103686674 A   3/2014
CN   103825788 A   5/2014
(Continued)

OTHER PUBLICATIONS

Korean Office Action dated Oct. 14, 2021, issued in Korean Patent Application No. 10-2018-0032905.
(Continued)

*Primary Examiner* — Aravind K Moorthy
(74) *Attorney, Agent, or Firm* — Jefferson IP Law, LLP

(57) ABSTRACT

The present disclosure relates to a method and a device for authenticating a device using wireless LAN. A method of an access point in a wireless communication system, according to an embodiment of the present invention, comprises the steps of: receiving a request message for wireless LAN access of a second terminal from a first terminal; performing an authentication procedure for the second terminal based on identification information of the second terminal and authentication information of the first terminal included in the
(Continued)

request message; and transmitting a response message including an authentication result for the second terminal to the first terminal.

11 Claims, 21 Drawing Sheets

(51) Int. Cl.
  *H04L 43/028* (2022.01)
  *H04W 76/10* (2018.01)
  *H04W 84/12* (2009.01)

(58) Field of Classification Search
  CPC ..... H04W 12/71; H04W 12/63; H04W 80/12; H04W 88/04; H04W 88/08; H04B 17/318; H04L 43/028
  See application file for complete search history.

(56) References Cited

U.S. PATENT DOCUMENTS

| | | | |
|---|---|---|---|
| 8,161,283 B2* | 4/2012 | Metke | H04W 12/50 713/168 |
| 8,577,734 B2 | 11/2013 | Treyz et al. | |
| 8,589,675 B2 | 11/2013 | Zhong | |
| 8,724,639 B2 | 5/2014 | Mahmoud | |
| 8,743,753 B2 | 6/2014 | In et al. | |
| 8,948,921 B2 | 2/2015 | Halahan et al. | |
| 9,019,878 B2 | 4/2015 | Anders, Jr. et al. | |
| 9,092,177 B2 | 7/2015 | Chang et al. | |
| 9,116,723 B2 | 8/2015 | Chang et al. | |
| 9,154,483 B1* | 10/2015 | Haskin | H04L 63/08 |
| 9,179,399 B2 | 11/2015 | Montemurro et al. | |
| 9,198,213 B2 | 11/2015 | Kim | |
| 9,204,472 B1 | 12/2015 | Boyle et al. | |
| 9,271,255 B1* | 2/2016 | Jones | H04W 76/15 |
| 9,284,045 B1 | 3/2016 | Springer et al. | |
| 9,320,121 B2 | 4/2016 | Sun et al. | |
| 9,383,956 B2 | 7/2016 | Chang et al. | |
| 9,480,913 B2 | 11/2016 | Briggs | |
| 9,585,184 B1* | 2/2017 | Sheriff | H04W 76/15 |
| 9,587,431 B2 | 3/2017 | Choo et al. | |
| 9,589,397 B1* | 3/2017 | Christopher | H04W 12/06 |
| 9,596,716 B2 | 3/2017 | Deng et al. | |
| 9,642,699 B2 | 5/2017 | Wortz et al. | |
| 9,700,781 B2 | 7/2017 | Monari et al. | |
| 9,794,965 B1* | 10/2017 | Yu | H04L 67/12 |
| 9,820,315 B2 | 11/2017 | Le Guen et al. | |
| 9,833,194 B2 | 12/2017 | Hayes et al. | |
| 9,844,096 B2 | 12/2017 | Son et al. | |
| 9,882,988 B1* | 1/2018 | Yu | H04W 4/70 |
| 9,888,337 B1 | 2/2018 | Zalewski et al. | |
| 9,900,919 B1* | 2/2018 | Butler | H04W 52/0229 |
| 10,064,059 B1* | 8/2018 | Yu | H04W 48/12 |
| 10,264,433 B2* | 4/2019 | Ahearn | H04W 12/06 |
| 10,412,346 B1* | 9/2019 | Yu | H04L 51/046 |
| 10,447,683 B1* | 10/2019 | Loladia | H04W 12/71 |
| 10,470,102 B2* | 11/2019 | Keidar | H04L 63/0227 |
| 10,674,312 B2* | 6/2020 | Jiang | H04W 64/00 |
| 10,779,162 B1* | 9/2020 | Wei | H04W 76/14 |
| 2004/0053613 A1* | 3/2004 | Karaoguz | H04W 4/24 455/411 |
| 2004/0218568 A1* | 11/2004 | Goodall | H04L 1/206 370/332 |
| 2005/0079859 A1* | 4/2005 | Eakin | H04L 69/329 455/410 |
| 2005/0107038 A1* | 5/2005 | Coutts | H04W 48/18 455/41.2 |
| 2005/0275511 A1* | 12/2005 | Luo | B60R 25/305 340/5.72 |
| 2005/0285737 A1* | 12/2005 | Kobayashi | G08B 25/007 340/552 |
| 2006/0023642 A1* | 2/2006 | Roskowski | H04L 43/12 370/254 |
| 2006/0046709 A1* | 3/2006 | Krumm | H04W 64/00 455/422.1 |
| 2006/0190721 A1* | 8/2006 | Kawakami | H04L 63/162 713/161 |
| 2006/0256012 A1* | 11/2006 | Fok | H04M 15/8088 342/457 |
| 2007/0004357 A1* | 1/2007 | Ojo | H04B 17/318 455/333 |
| 2007/0004358 A1* | 1/2007 | Moorti | H03G 3/3068 455/67.11 |
| 2007/0082677 A1* | 4/2007 | Donald Hart | H04W 16/18 455/456.1 |
| 2007/0104166 A1* | 5/2007 | Rahman | H04W 36/32 370/338 |
| 2007/0186104 A1* | 8/2007 | Suzuki | H04L 63/08 713/168 |
| 2008/0002642 A1* | 1/2008 | Borkar | H04W 8/005 370/338 |
| 2008/0009258 A1* | 1/2008 | Safarian | H04B 1/525 455/307 |
| 2008/0014934 A1* | 1/2008 | Balasubramanian | H04W 84/12 455/437 |
| 2008/0091541 A1* | 4/2008 | Law | G06Q 30/02 705/14.58 |
| 2008/0311871 A1* | 12/2008 | Qi | H04B 17/29 455/226.2 |
| 2009/0327560 A1* | 12/2009 | Yalovsky | G06F 13/387 726/6 |
| 2010/0037071 A1 | 2/2010 | Chang | |
| 2010/0046596 A1* | 2/2010 | Suzuki | G08B 25/007 375/227 |
| 2010/0080134 A1* | 4/2010 | Maniatopoulos | H04W 48/16 370/252 |
| 2010/0128689 A1* | 5/2010 | Yoon | H04W 72/542 370/329 |
| 2010/0131751 A1* | 5/2010 | Reznik | H04L 63/16 370/252 |
| 2010/0167777 A1* | 7/2010 | Raghothaman | H04W 52/245 455/522 |
| 2010/0167778 A1* | 7/2010 | Raghothaman | H04W 52/146 455/67.11 |
| 2011/0065391 A1* | 3/2011 | Shiotsuki | H04B 17/318 455/63.4 |
| 2011/0069627 A1* | 3/2011 | Sridhara | H04W 64/003 370/252 |
| 2011/0103360 A1* | 5/2011 | Ku | G01S 5/021 370/338 |
| 2011/0110521 A1* | 5/2011 | Yang | H04W 48/20 709/222 |
| 2011/0136498 A1* | 6/2011 | Ben-Eli | H04B 17/318 455/452.2 |
| 2011/0171993 A1* | 7/2011 | Kim | G01S 5/02524 455/67.11 |
| 2011/0222408 A1* | 9/2011 | Kasslin | H04W 72/02 370/328 |
| 2011/0268274 A1* | 11/2011 | Qiu | H04L 9/0844 380/270 |
| 2011/0275361 A1* | 11/2011 | Yavuz | H04W 52/245 455/422.1 |
| 2012/0099566 A1* | 4/2012 | Laine | H04M 1/72412 455/41.1 |
| 2012/0100803 A1* | 4/2012 | Suumaki | H04L 12/03 455/41.1 |
| 2012/0209951 A1* | 8/2012 | Enns | H04L 69/28 709/217 |
| 2012/0225663 A1* | 9/2012 | Gupta | H04W 64/00 455/456.1 |
| 2012/0230305 A1* | 9/2012 | Barbu | H04W 48/20 370/338 |
| 2012/0232367 A1* | 9/2012 | Allegri | G16H 40/20 600/365 |
| 2012/0240191 A1* | 9/2012 | Husney | H04W 12/06 726/3 |
| 2012/0240197 A1 | 9/2012 | Tran et al. | |

(56) References Cited

U.S. PATENT DOCUMENTS

| | | | |
|---|---|---|---|
| 2012/0264474 A1* | 10/2012 | Joh | H04W 52/0219 455/517 |
| 2012/0276944 A1* | 11/2012 | Liao | H04L 5/0023 455/524 |
| 2012/0282914 A1 | 11/2012 | Alexander | |
| 2013/0014232 A1* | 1/2013 | Louboutin | H04L 67/14 726/5 |
| 2013/0058274 A1* | 3/2013 | Scherzer | H04W 12/08 370/328 |
| 2013/0074108 A1 | 3/2013 | Cline et al. | |
| 2013/0077505 A1* | 3/2013 | Choudhary | H04W 48/14 370/252 |
| 2013/0079030 A1* | 3/2013 | Kang | G01S 5/0036 455/7 |
| 2013/0094484 A1* | 4/2013 | Kneckt | H04W 48/16 370/338 |
| 2013/0110293 A1 | 5/2013 | Illig | |
| 2013/0169417 A1* | 7/2013 | Sugano | G06K 7/01 340/10.1 |
| 2013/0176870 A1* | 7/2013 | Huang | H01Q 1/246 370/252 |
| 2013/0177055 A1* | 7/2013 | Huang | H01Q 3/00 375/224 |
| 2013/0189929 A1* | 7/2013 | Takahashi | G01S 3/38 342/372 |
| 2013/0198817 A1* | 8/2013 | Haddad | H04L 63/18 726/5 |
| 2013/0231160 A1 | 9/2013 | Rao et al. | |
| 2013/0268232 A1* | 10/2013 | Poduri | H04W 4/029 702/150 |
| 2013/0281021 A1* | 10/2013 | Palin | H04W 8/005 455/41.2 |
| 2013/0283351 A1* | 10/2013 | Palin | G06F 21/6218 726/4 |
| 2013/0288704 A1* | 10/2013 | Wirola | H04W 64/00 455/456.1 |
| 2013/0318572 A1* | 11/2013 | Singh | H04W 84/12 726/4 |
| 2013/0335193 A1* | 12/2013 | Hanson | G07C 9/00174 340/5.61 |
| 2013/0339865 A1 | 12/2013 | Oslund et al. | |
| 2014/0006540 A1 | 1/2014 | Rao et al. | |
| 2014/0024411 A1 | 1/2014 | Rao et al. | |
| 2014/0026192 A1* | 1/2014 | Gatewood | H04L 63/0884 726/4 |
| 2014/0044263 A1* | 2/2014 | King | H04W 12/033 380/270 |
| 2014/0067131 A1 | 3/2014 | Park et al. | |
| 2014/0153434 A1* | 6/2014 | Kokovidis | H04W 48/16 370/252 |
| 2014/0161103 A1* | 6/2014 | Sirotkin | H04W 36/0088 370/332 |
| 2014/0179352 A1* | 6/2014 | V.M. | H04W 64/00 455/456.2 |
| 2014/0269535 A1* | 9/2014 | Pazhyannur | H04W 40/24 370/329 |
| 2014/0313910 A1* | 10/2014 | Appleton | H04L 1/20 370/252 |
| 2014/0329497 A1* | 11/2014 | Sanzgiri | H04L 63/0492 455/26.1 |
| 2014/0334320 A1* | 11/2014 | Liu | H04L 5/0098 370/252 |
| 2014/0365694 A1* | 12/2014 | Bolton | H04W 80/02 710/106 |
| 2014/0366105 A1* | 12/2014 | Bradley | H04L 63/083 726/5 |
| 2015/0003265 A1* | 1/2015 | Mansour | H04W 4/029 370/252 |
| 2015/0009862 A1* | 1/2015 | Zhang | H04B 5/0031 370/254 |
| 2015/0022381 A1* | 1/2015 | Kang | H04W 64/00 340/995.12 |
| 2015/0055689 A1* | 2/2015 | Tarighat Mehrabani | H04B 7/0617 375/219 |
| 2015/0071052 A1* | 3/2015 | Hershberg | H04W 24/04 370/216 |
| 2015/0072653 A1* | 3/2015 | Fan | H04W 12/06 455/411 |
| 2015/0072704 A1* | 3/2015 | Colby | H04W 4/023 455/456.1 |
| 2015/0077248 A1 | 3/2015 | Eck | |
| 2015/0081837 A1* | 3/2015 | Bernier | H04W 4/80 709/217 |
| 2015/0081904 A1* | 3/2015 | Guedalia | H04L 67/12 709/225 |
| 2015/0085848 A1* | 3/2015 | Reunamaki | H04W 48/08 370/338 |
| 2015/0127486 A1 | 5/2015 | Advani | |
| 2015/0130630 A1 | 5/2015 | Outwater et al. | |
| 2015/0133157 A1* | 5/2015 | Xiao | G01S 5/06 455/456.1 |
| 2015/0172925 A1* | 6/2015 | Leppanen | H04W 12/04 726/7 |
| 2015/0181628 A1 | 6/2015 | Haverinen et al. | |
| 2015/0204964 A1* | 7/2015 | Hirano | G01S 5/12 370/252 |
| 2015/0237595 A1* | 8/2015 | Le Grand | H04W 64/006 370/338 |
| 2015/0245358 A1* | 8/2015 | Schmidt | H04W 72/52 370/329 |
| 2015/0251102 A1 | 9/2015 | Kuo | |
| 2015/0295915 A1* | 10/2015 | Xiu | H04L 67/55 726/7 |
| 2015/0327062 A1* | 11/2015 | Tatavarty | G06F 21/34 726/6 |
| 2015/0339418 A1* | 11/2015 | Blackwell | G01R 29/10 703/13 |
| 2015/0348403 A1 | 12/2015 | Berelejis et al. | |
| 2015/0350913 A1* | 12/2015 | Eberwine | G06Q 20/3821 455/411 |
| 2015/0351071 A1* | 12/2015 | Pandey | H04W 4/02 455/456.1 |
| 2015/0382196 A1* | 12/2015 | Hillier | H04W 12/50 726/7 |
| 2015/0382217 A1 | 12/2015 | Odio Vivi et al. | |
| 2015/0382278 A1* | 12/2015 | Fallon | H04W 40/10 370/338 |
| 2016/0007288 A1* | 1/2016 | Samardzija | H04W 52/0229 370/311 |
| 2016/0007386 A1* | 1/2016 | Park | H04W 48/14 370/329 |
| 2016/0013980 A1 | 1/2016 | McKnight et al. | |
| 2016/0037439 A1* | 2/2016 | Shamis | H04W 4/02 370/329 |
| 2016/0043895 A1 | 2/2016 | Hwang et al. | |
| 2016/0055742 A1* | 2/2016 | Wang | G08C 17/02 340/12.5 |
| 2016/0057791 A1* | 2/2016 | Su | H04W 12/50 370/328 |
| 2016/0087954 A1 | 3/2016 | Zhang | |
| 2016/0127006 A1* | 5/2016 | Majjigi | H04B 7/0802 455/78 |
| 2016/0127028 A1* | 5/2016 | Wang | H04B 7/0877 370/329 |
| 2016/0131733 A1* | 5/2016 | Do | G01S 5/0226 342/378 |
| 2016/0135205 A1* | 5/2016 | Barbu | H04W 48/20 370/338 |
| 2016/0156719 A1 | 6/2016 | Mobarak et al. | |
| 2016/0182624 A1* | 6/2016 | Liang | H04L 12/12 709/228 |
| 2016/0205362 A1 | 7/2016 | Tang et al. | |
| 2016/0226740 A1* | 8/2016 | Van Oost | H04L 43/0894 |
| 2016/0226842 A1 | 8/2016 | Mower | |
| 2016/0241401 A1* | 8/2016 | Wang | H04L 9/14 |
| 2016/0241541 A1* | 8/2016 | Soelberg | H04L 63/083 |
| 2016/0242080 A1* | 8/2016 | Vikberg | H04W 36/0027 |

(56) References Cited

U.S. PATENT DOCUMENTS

| | | | |
|---|---|---|---|
| 2016/0248746 A1* | 8/2016 | James | H04L 67/12 |
| 2016/0269971 A1* | 9/2016 | Kim | H04W 72/1215 |
| 2016/0270129 A1* | 9/2016 | Wang | H04W 76/10 |
| 2016/0308869 A1 | 10/2016 | Meng et al. | |
| 2016/0323689 A1 | 11/2016 | Goluboff | |
| 2016/0323786 A1* | 11/2016 | Syed | H04W 36/0038 |
| 2016/0330776 A1* | 11/2016 | Ren | H04W 76/10 |
| 2016/0337804 A1* | 11/2016 | Kim | H04W 4/33 |
| 2016/0338118 A1* | 11/2016 | Vajapeyam | H04B 17/318 |
| 2017/0043244 A1 | 2/2017 | Briggs | |
| 2017/0059687 A1* | 3/2017 | Dinesh | G01S 5/0263 |
| 2017/0063823 A1* | 3/2017 | Cheng | H04W 12/08 |
| 2017/0094524 A1* | 3/2017 | Mazzarella | H04L 63/10 |
| 2017/0094693 A1* | 3/2017 | Law | H04W 8/005 |
| 2017/0099593 A1 | 4/2017 | McLean, Jr. et al. | |
| 2017/0111161 A1* | 4/2017 | Raggio | H04B 7/15535 |
| 2017/0118015 A1* | 4/2017 | Kwak | G05B 15/02 |
| 2017/0126648 A1* | 5/2017 | Bond | H04L 63/0492 |
| 2017/0135145 A1* | 5/2017 | Amini | H04L 45/20 |
| 2017/0142086 A1* | 5/2017 | Chen | H04W 76/15 |
| 2017/0188397 A1* | 6/2017 | Liang | H04W 24/08 |
| 2017/0195424 A1* | 7/2017 | Nasir | H04L 67/75 |
| 2017/0208006 A1* | 7/2017 | Patil | H04W 48/20 |
| 2017/0238236 A1 | 8/2017 | Miller et al. | |
| 2017/0249116 A1 | 8/2017 | Chang et al. | |
| 2017/0251450 A1* | 8/2017 | Song | H04L 67/535 |
| 2017/0295465 A1* | 10/2017 | Bitra | H04W 48/16 |
| 2017/0325270 A1 | 11/2017 | Tenny et al. | |
| 2017/0339011 A1* | 11/2017 | Condeixa | H04L 67/1097 |
| 2017/0339224 A1* | 11/2017 | Condeixa | H04W 4/029 |
| 2017/0366249 A1* | 12/2017 | Van Oost | H04W 52/0206 |
| 2017/0374602 A1* | 12/2017 | Gokturk | H04L 45/125 |
| 2018/0007551 A1 | 1/2018 | Wang et al. | |
| 2018/0027353 A1* | 1/2018 | Merino | H04W 4/50 455/436 |
| 2018/0034569 A1* | 2/2018 | Gilberton | G01S 5/017 |
| 2018/0035365 A1* | 2/2018 | Koratekere Honnappa | H04W 48/16 |
| 2018/0041985 A1* | 2/2018 | Davaadorj | H04W 64/003 |
| 2018/0063240 A1* | 3/2018 | Kurian | H04W 4/06 |
| 2018/0077741 A1* | 3/2018 | Pan | H04W 88/02 |
| 2018/0084483 A1* | 3/2018 | Astigarraga | H04W 76/14 |
| 2018/0114282 A1* | 4/2018 | Unnerstall | G06Q 20/3278 |
| 2018/0124670 A1* | 5/2018 | Alanen | H04W 36/165 |
| 2018/0176071 A1* | 6/2018 | Jabbar | H04L 41/142 |
| 2018/0176079 A1* | 6/2018 | Teo | H04W 52/0219 |
| 2018/0176771 A1* | 6/2018 | Yang | H04W 12/06 |
| 2018/0181639 A1* | 6/2018 | Lee | G06F 16/285 |
| 2018/0183666 A1* | 6/2018 | Likar | H04L 41/0809 |
| 2018/0199224 A1* | 7/2018 | Li | H04W 24/10 |
| 2018/0227811 A1* | 8/2018 | Nagasaka | H04W 36/0066 |
| 2018/0227812 A1* | 8/2018 | Nagasaka | H04W 48/18 |
| 2018/0248634 A1* | 8/2018 | Pascolini | H04B 17/318 |
| 2018/0255426 A1* | 9/2018 | Liao | H04W 4/021 |
| 2018/0270612 A1* | 9/2018 | Thoresen | G01S 1/02 |
| 2018/0288617 A1* | 10/2018 | Robison | H04L 63/08 |
| 2018/0310133 A1* | 10/2018 | Ramasamy | H04W 64/003 |
| 2018/0316658 A1* | 11/2018 | Bartlett | H04W 12/041 |
| 2018/0338336 A1* | 11/2018 | Seo | H04W 88/06 |
| 2018/0348334 A1* | 12/2018 | Millman | G01S 5/02527 |
| 2018/0352379 A1* | 12/2018 | Kong | H04W 4/025 |
| 2018/0368049 A1* | 12/2018 | Patil | H04W 40/248 |
| 2019/0036965 A1* | 1/2019 | Luo | H04L 63/1458 |
| 2019/0089607 A1* | 3/2019 | Jain | H04L 43/0817 |
| 2019/0116205 A1* | 4/2019 | Chen | H04L 63/166 |
| 2019/0116493 A1* | 4/2019 | Cyril | H04W 12/06 |
| 2019/0239068 A1* | 8/2019 | Mudulodu | H04L 9/3226 |
| 2019/0346554 A1* | 11/2019 | Park | H04W 4/023 |
| 2020/0053559 A1* | 2/2020 | Kim | G08B 13/00 |
| 2020/0084611 A1* | 3/2020 | Huang | H04W 48/18 |

FOREIGN PATENT DOCUMENTS

| | | | |
|---|---|---|---|
| CN | 104506397 A | | 4/2015 |
| CN | 105049416 A | | 11/2015 |
| CN | 106028423 A | | 10/2016 |
| CN | 106332224 A | | 1/2017 |
| CN | 106550360 A | | 3/2017 |
| CN | 107071776 A | | 8/2017 |
| CN | 107222908 A | | 9/2017 |
| CN | 107454655 A | | 12/2017 |
| CN | 107466055 A | | 12/2017 |
| CN | 107786976 A | | 3/2018 |
| EP | 2372971 A1 | | 10/2011 |
| KR | 10-2004-0062709 A | | 7/2004 |
| KR | 10-2017-0013337 A | | 2/2017 |

OTHER PUBLICATIONS

Chinese Office Action dated Oct. 11, 2023, issued in Chinese Patent Application No. 201980016399.3.

Chinese Notice of Allowance dated Mar. 27, 2024, issued in Chinese Patent Application No. 201980016399.3.

* cited by examiner

METHOD AND DEVICE FOR AUTHENTICATING DEVICE USING WIRELESS LAN SERVICE

TECHNICAL FIELD

The disclosure relates to a wireless communication system and, more particularly, to a method and apparatus for authenticating a device using a wireless LAN service.

BACKGROUND ART

Wireless local area network (LAN) services are provided at various hotspots such as hotels, coffee shops, business centers, stadiums, subways, etc., and users can use the Internet by connecting smart devices such as smartphones, tablets, and notebook PCs to wireless networks. The hotspot is operated by an open wireless network method that does not require user authentication or a secure wireless network method that requires user authentication. In the open wireless network method for user convenience, a terminal can directly connect to a wireless network without a password or credential for accessing the wireless LAN. On the other hand, for indiscriminate use prevention and network management, a wireless LAN service provider can limit access authority through user authentication only to customers who have paid a fee. As a method for performing user authentication in such a secure wireless network, captive portal-based authentication, 802.1X-based authentication, and the like are used.

Of these, as to the captive portal method, when the customer who paid a fee launches an Internet web browser of a smart device, the Internet web browser is redirected to a login page screen of the captive portal method. At this time, the device is in a state where internet access other than the login page is not available, and the customer can use the Internet when the user authentication is completed by entering user identification (ID) and a password obtained at the time of payment. As such, the captive portal of the disclosure may refer to a web page for inputting information for user authentication.

Such a captive portal method is widely used due to its convenience, but it can be used only for devices that can display a web-based login portal and can receive user input due to a built-in web browser and display.

However, wireless modules are increasingly installed in various IoT devices (e.g. smart watches, smart bands, game consoles, home appliances, etc.) to make wireless access possible, and in a situation where a user has various wireless devices other than a smart device, a web browser or a user input device is not built-in, so there is a problem in that captive portal-based user authentication and Internet access are difficult.

In addition, there is a problem in that user authentication is difficult for devices that do not support an access point (AP) mode. Therefore, there is a need for an efficient authentication method for a device using a wireless LAN.

DISCLOSURE OF INVENTION

Technical Problem

Therefore, the disclosure has been proposed to solve the above-mentioned problems, and an aspect of the disclosure is to provide a method and apparatus for authenticating a device efficiently.

Solution to Problem

In accordance with an aspect of the disclosure, a method of an access point (AP) may include: receiving a request message for wireless LAN access of a second terminal from a first terminal; performing an authentication procedure for the second terminal using identification information of the second terminal and authentication information of the first terminal which are included in the request message; and transmitting a response message including an authentication result for the second terminal to the first terminal.

In accordance with another aspect of the disclosure, a method of a first terminal in a wireless communication system may include: transmitting a request message for wireless LAN access of a second terminal to an AP; and receiving a response message including an authentication result for the second terminal from the AP, wherein identification information of the second terminal and authentication information of the first terminal included in the request message are used in an authentication procedure for the second terminal.

In accordance with another aspect of the disclosure, an AP in a wireless communication system may include: a transceiver; and a controller configured to receive a request message for wireless LAN access of a second terminal from a first terminal, to perform an authentication procedure for the second terminal using identification information of the second terminal and authentication information of the first terminal which are included in the request message, and to transmit a response message including an authentication result for the second terminal to the first terminal.

In accordance with another aspect of the disclosure, a first terminal in a wireless communication system may include: a transceiver; and a controller configured to transmit a request message for wireless LAN access for a second terminal to an AP and to receive a response message including an authentication result for the second terminal from the AP, wherein identification information of the second terminal and authentication information of the first terminal which are included in the request message are used for an authentication procedure for the second terminal.

Advantageous Effects of Invention

According to an embodiment of the disclosure, it is possible to easily authenticate a device in an area that provides a wireless LAN service. Further, according to an embodiment of the disclosure, it is possible to authenticate a device without a web browser or a user input device. Further, according to an embodiment of the disclosure, it is possible to authenticate a device that does not support an access point (AP) mode.

MODE FOR THE INVENTION

Figure 1:
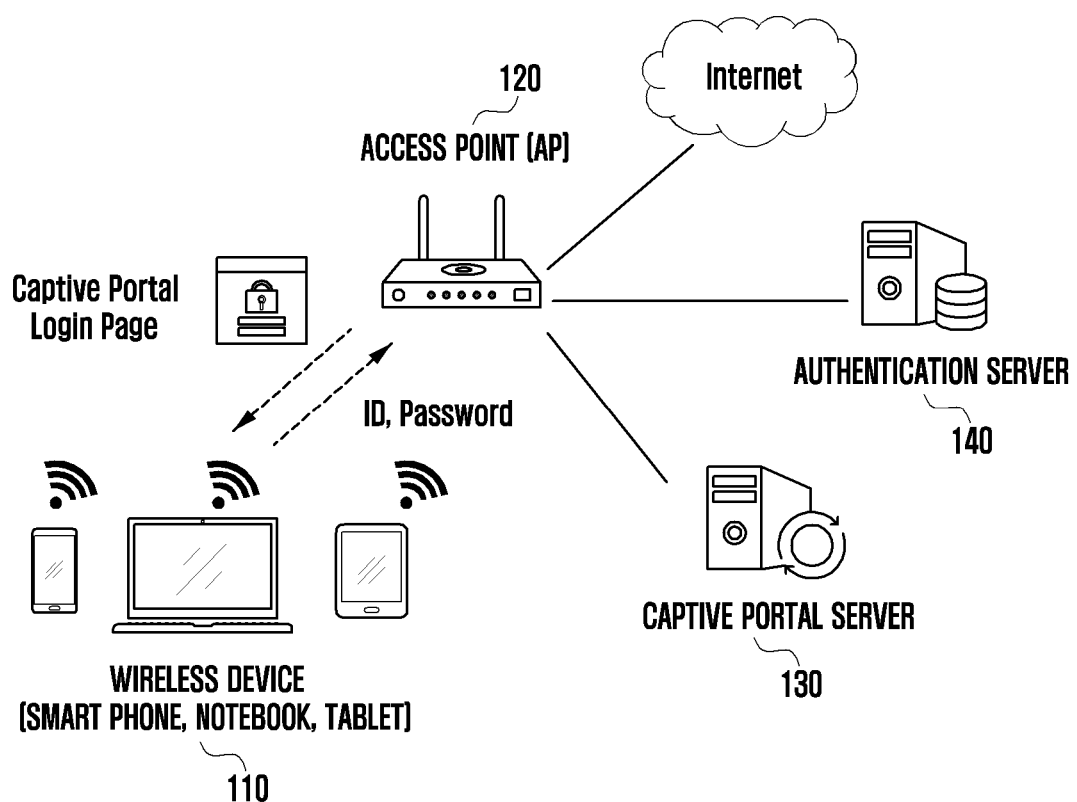
FIG. 1 is a diagram illustrating devices for user authentication in a captive portal method.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Wireless local area network (LAN) services are provided at various hotspots such as hotels, coffee shops, business centers, stadiums, subways, etc., and users can use the Internet by connecting smart devices such as smartphones, tablets, and notebook PCs to wireless networks. The hotspot is operated by an open wireless network method that does not require user authentication or a secure wireless network method that requires user authentication. In the open wireless network method for user convenience, a terminal can directly connect to a wireless network without a password or credential for accessing the wireless LAN. On the other hand, for indiscriminate use prevention and network management, a wireless LAN service provider can limit access authority through user authentication only to customers who have paid a fee. As a method for performing user authentication in such a secure wireless network, captive portal-based authentication, 802.1X-based authentication, and the like are used.

Of these, as to the captive portal method, when the customer who paid a fee launches an Internet web browser of a smart device, the Internet web browser is redirected to a login page screen of the captive portal method. At this time, the device is in a state where internet access other than the login page is not available, and the customer can use the Internet when the user authentication is completed by entering user identification (ID) and a password obtained at the time of payment. As such, the captive portal of the disclosure may refer to a web page for inputting information for user authentication.

Such a captive portal method is widely used due to its convenience, but it can be used only for devices that can display a web-based login portal and can receive user input due to a built-in web browser and display.

However, wireless modules are increasingly installed in various IoT devices (e.g. smart watch, smart band, game console, home appliance, etc.) to make wireless access possible, and in a situation where a user has various wireless devices other than a smart device, a web browser or a user input device is not built-in, so there is a problem in that captive portal-based user authentication and Internet access are difficult.

Hereinafter, a specific description of a user authentication method of the captive portal method will be made.

FIG. 1 is a diagram illustrating devices for user authentication in a captive portal method.

As illustrated in FIG. 1, Internet access through user authentication of the captive portal method may include a wireless smart device configured to launch a web browser and execute user input; an access point (AP) 120 configured to communicate with the smart device 110 and a web server; the web server (or a captive portal server) 130 configured to provide a captive portal login page; and an authentication server (e.g., authentication, authorization, accounting (AAA) server) 140. The web server may be embedded in the AP or externally located.

The captive portal server in the disclosure may refer to a server that provides a web page for inputting information for user authentication.

Meanwhile, in the disclosure, a device capable of launching a web browser and executing user input is referred to as a smart device, and a device to be connected to a wireless LAN using the smart device is referred to as a wireless device. However, the terms of the disclosure are not limited thereto, and any term (e.g., a first terminal and a second terminal) capable of distinguishing the smart device from the wireless device may be used.

Figure 2:
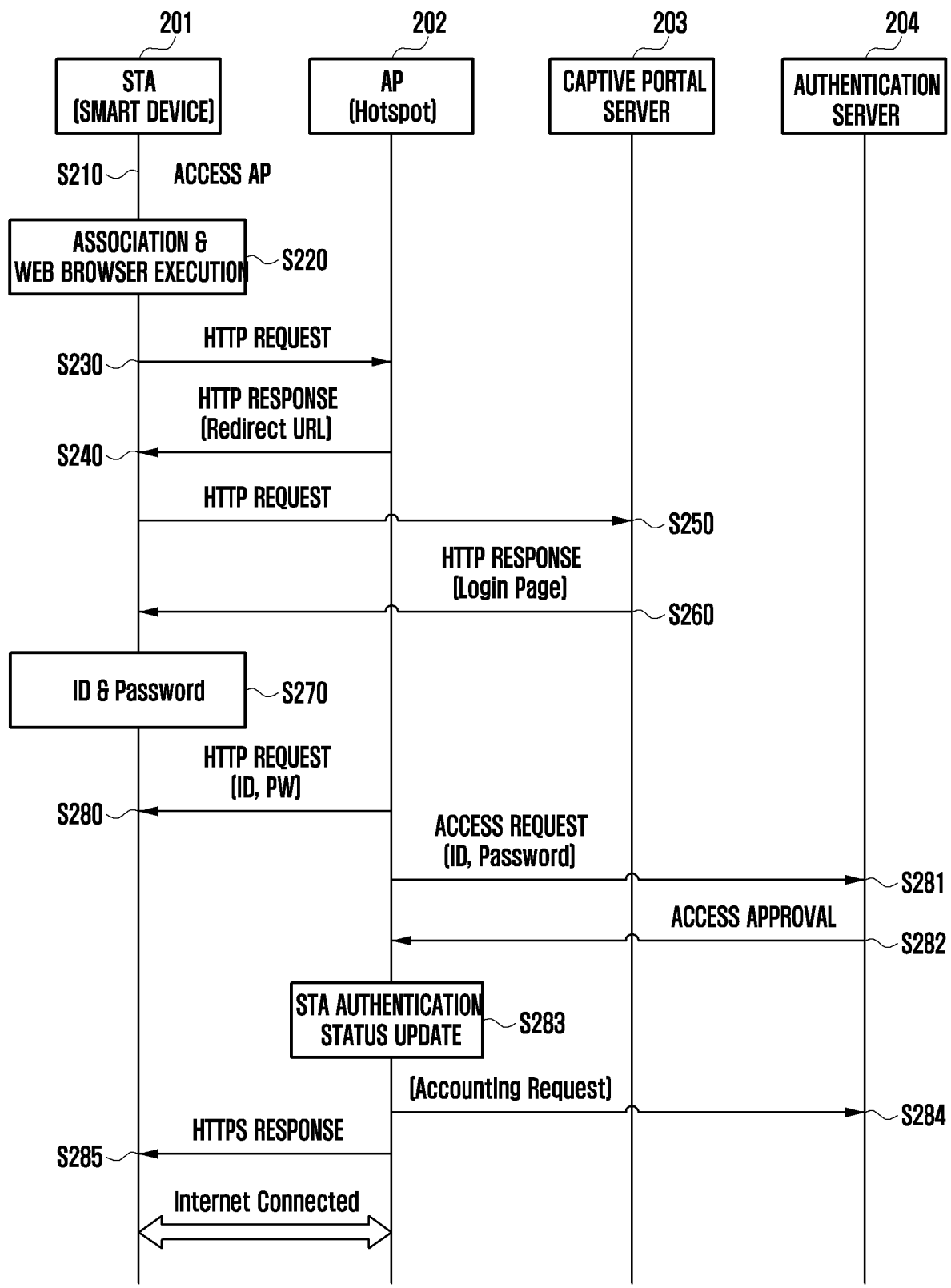
FIG. 2 is a diagram illustrating an Internet access process through user authentication in a captive portal method.

FIG. 2 is a diagram illustrating an Internet access process through user authentication in a captive portal method.

Referring to FIG. 2, when a station STA 201 including a smart device or the like accesses a hotspot AP 202 in a hotspot region in operation S210, the STA 201 may access (or associate) the AP 202 and may then launch a web browser in operation S220.

When the web browser is launched in the STA 201, the STA 201 may transmit an HTTP request to the AP 202 in operation S230. In this case, when the unauthenticated STA 201 attempts to access a specific website, the AP 202 may block IP communication of the unauthenticated user and may respond by adding the URL of the captive portal server to an HTTP redirect message (e.g., HTTP 302 found message) with respect to the HTTP request (e.g., HTTP get) in operation S240. In the AP 202, IP information or MAC information of the STA 201 may be used to distinguish unauthorized users.

The STA 201 may make the HTTP request again with the captive portal URL of the web server in operation S250, and the captive portal server 203 may respond by adding a login page to a user HTTP response (e.g. HTTP 200 OK). The user may input user information (ID and password) to the received login page in operation S270 and may transmit (HTTPS post) the input user information in operation S280.

The AP 202 may transmit an access request message including the received ID and password to an authentication server 204 in operation S281 and may receive information indicating whether authentication is performed in operation S282.

When authentication is successfully completed, the AP 202 may allow the STA to access the Internet and does not redirect any more. Accordingly, the AP 202 may update the authentication status of the STA in operation S283, and if necessary, the AP 202 may transmit an accounting request message to the authentication server (authentication, authorization, accounting server {AAA server}) in operation S284 to confirm data usage statistics for each user for the purpose of billing or the like. Next, the AP 204 may transmit an HTTPS response to the STA in operation S285.

Such captive portal-based Internet access method is mainly used in hotspots, but it is difficult to use the captive portal-based Internet access method in a device that does not have a web browser, a display device, or a user input device.

Figure 3:
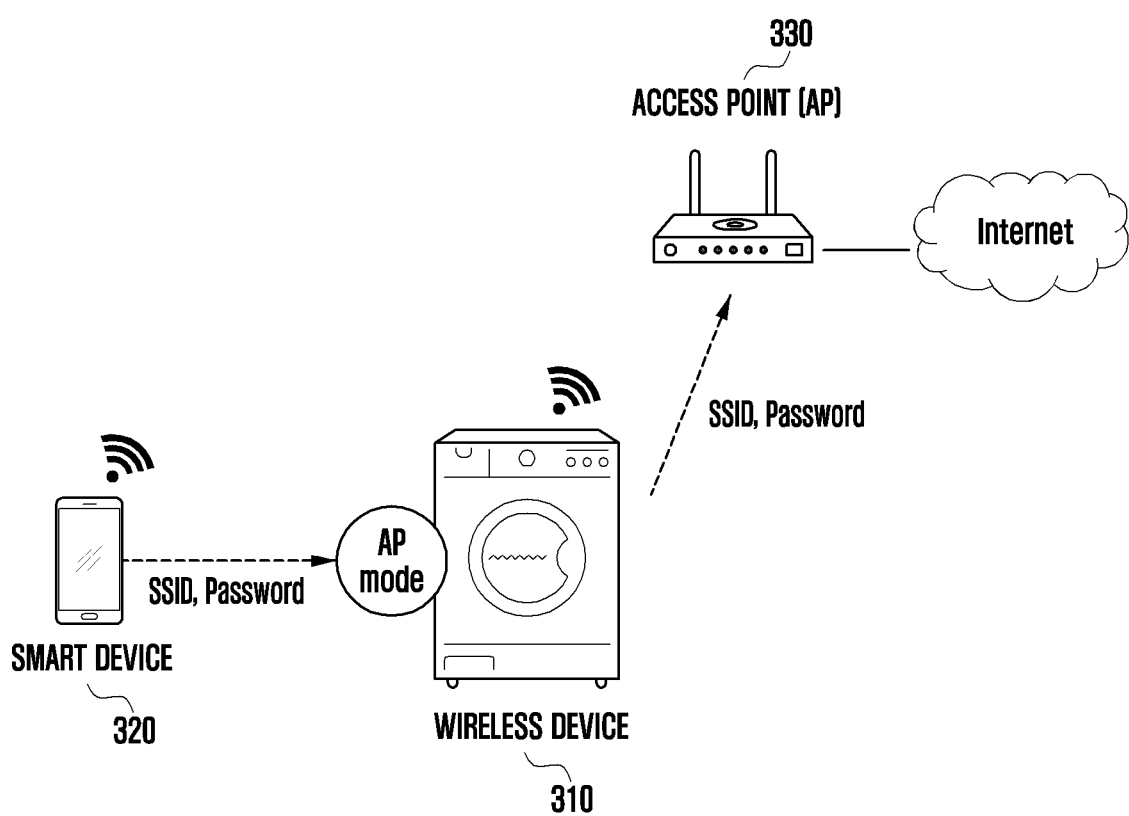
FIG. 3 is a diagram illustrating a method for enabling a device to access the Internet in an environment using security configuration of an AP without a separate authentication server.

Meanwhile, in an environment using the security configuration (e.g. PSK) of the AP without a separate authentication server, such as at home, the method shown in FIG. 3 may be considered as a method for enabling a device that does not have a web browser or a user input device to access the Internet.

FIG. 3 is a diagram illustrating a method for enabling a device to access the Internet in an environment using security configuration of an AP without a separate authentication server.

Referring to FIG. 3, a wireless device (e.g. a washing machine) 310 that is not equipped with a web browser but can be switched to an AP mode may be switched to the AP mode. The smart device 320 may be connected to the wireless device in a STA mode.

Authentication information (e.g. SSID or password) of the wireless device (AP mode) to be connected through the application of the smart device 320 may be transmitted to the wireless device.

The wireless device 310 may switch from the AP mode back to the STA mode and may access an AP 330 using the received AP authentication information. After that, the wireless device can be connected to the Internet, and it is possible to perform communication, such as controlling the wireless device remotely using the smart device.

As described above, the captive portal-based Internet access method is difficult to be used in the wireless device that does not have a web browser or a user input device, although wireless access is available.

In addition, when the wireless device accesses the Internet in the same manner as in FIG. 3, it has the following problems. Since the wireless device must support the AP mode, it cannot be applied to wireless devices (e.g., IoT devices, gears, game devices, etc.) that operate only in the STA mode, and when multiple wireless devices need to be connected to the Internet, a process of entering authentication information by connecting the smart device to the wireless device may be required to be repeated the same number of times as the number of the devices. In addition, this method can be utilized for the security configuration (e.g. PSK) of the AP without a separate authentication server at home. Also, since the captive portal method using a web browser is not used, this method may be difficult to be applied to a hotspot environment (e.g., a hotel, a cafe, etc.) that uses a separate authentication server.

In addition, for a wireless device that a user wants to connect to a wireless LAN, there is a problem that each wireless device has to receive authentication information from a smart device and transmit the received information to the AP.

Accordingly, the disclosure proposes a method for enabling a wireless device to access the Internet in such a manner that a smart device that has been already authenticated performs wireless LAN authentication instead of a wireless device that is difficult to access the wireless LAN due to the absence of the web browser or the user input device in the hotspot environment.

Figure 4:
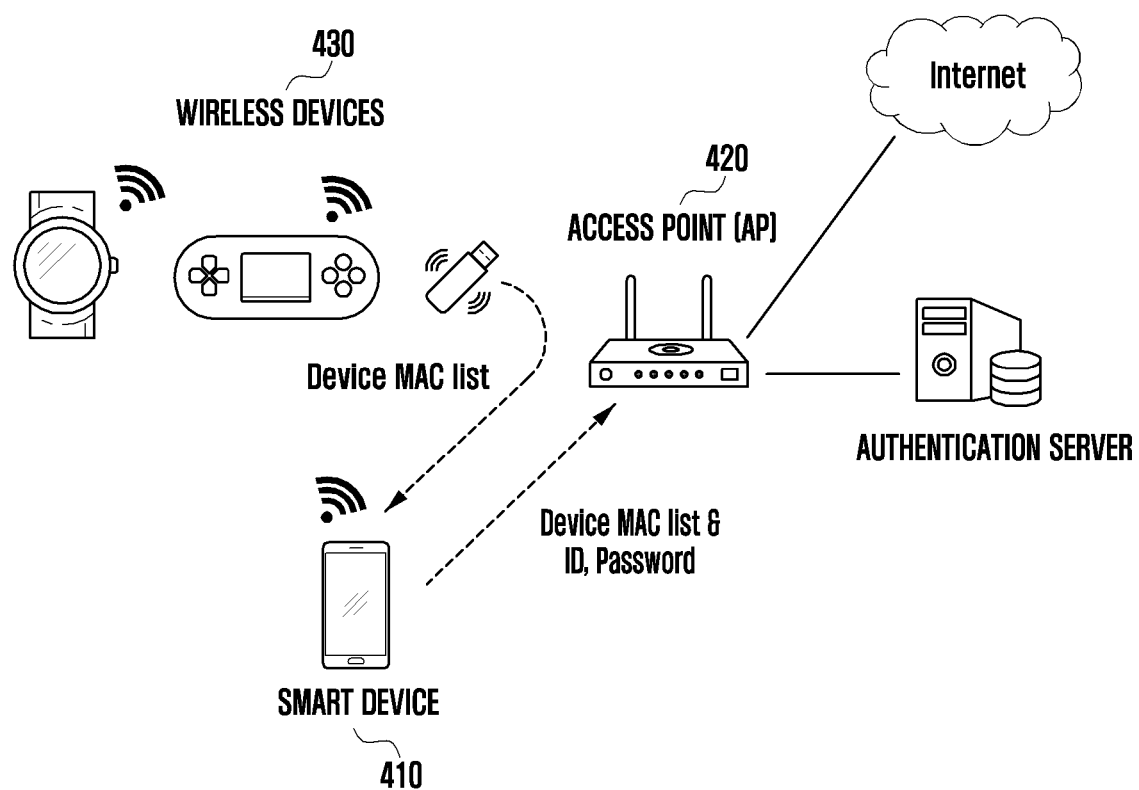
FIG. 4 is a diagram illustrating a method for enabling a wireless device proposed in the disclosure to access the Internet through a smart device.

FIG. 4 is a diagram illustrating a method for enabling a wireless device proposed in the disclosure to access the Internet through a smart device.

As illustrated in FIG. 4, when a smart device 410 requests a MAC list of accessible wireless devices 430 from an AP 420, the AP 420 may transmit the received MAC list of the wireless devices 430 to the smart device 410.

At this time, the AP may be associated with nearby wireless devices, may identify the wireless devices using received signals, and may manage a list of the wireless devices. Also, the AP may share the list of the wireless devices with neighboring APs. In addition, the AP 420 may transmit all the list of the accessible wireless devices to the smart device, or may filter the list and transmit the list to the smart device. Details of this will be described later.

Meanwhile, the smart device may directly receive signals from the wireless devices without receiving the list of the wireless devices through the AP, thereby identifying nearby accessible wireless devices. In addition, the smart device may filter and display the identified list of the wireless devices. However, when such a method is used, the smart device must be switched to the AP mode and be associated with the wireless devices in order to receive the signals from the wireless devices. In addition, in order for the wireless devices to access the Internet, there may be an inconvenience that the association with the smart device switched to the AP mode is required to be disconnected and association with the AP is required to be achieved.

The smart device may display the received MAC list on a screen. At this time, the smart device may display the name of the device corresponding to the MAC address of the wireless device, and the name of the device may be configured and stored by the user. Meanwhile, the filtering may be performed in the smart device.

When the user selects a wireless device to be authenticated from the list of the wireless devices, the smart device may transmit, to the AP, the MAC list of the selected wireless device and its user authentication information (e.g., ID or password) used by the user at the time of authentication, thereby performing authentication. As described above, it is possible to conveniently connect, to the wireless LAN, the wireless devices which have difficulty in accessing the wireless LAN in the captive portal method due to the absence of the web browser, the display device, the user input device, or the like.

Figure 5:
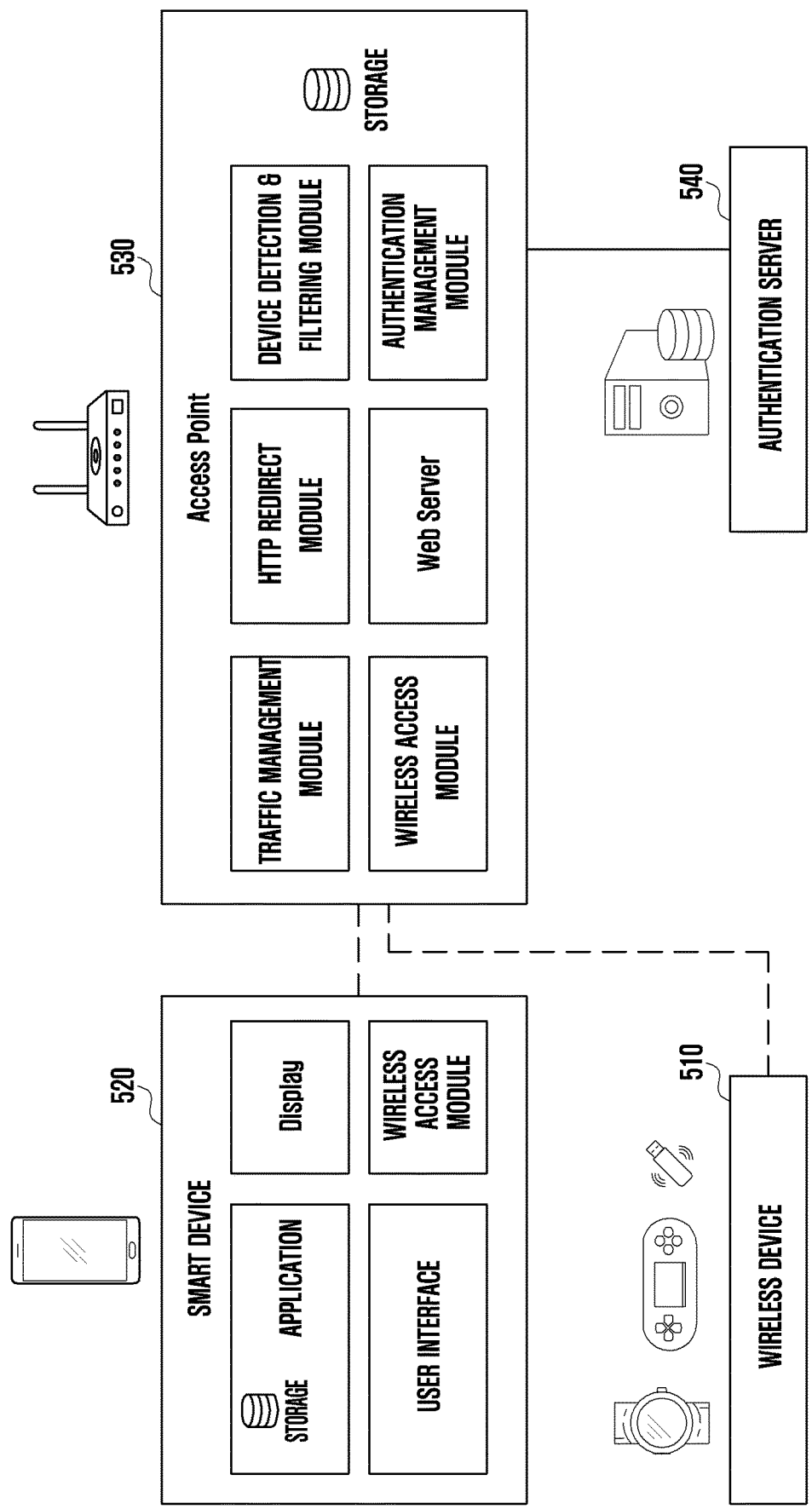
FIG. 5 is a diagram illustrating a configuration for performing authentication of a wireless device according to an embodiment of the disclosure.

FIG. 5 is a diagram illustrating a configuration for performing authentication of a wireless device according to an embodiment of the disclosure.

The configuration of the disclosure is composed of a wireless device 510, a smart device 520, an AP 530, and an authentication server 540 as shown in FIG. 5. The wireless device 510 may not have a web browser or a user input device, and may be a wireless device that can access a wireless LAN since a Wi-Fi station (STA) mode is supported.

The smart device 520 may include an application, a storage, a display device, a user input device (interface), and a wireless network module. The smart device 520 may refer to a wireless device capable of performing captive portal authentication through a web browser or application. In addition, the smart device 520 may interwork with the AP 530 to request a list of wireless devices from the AP 530, and may display a list of wireless devices received from the AP 530 on a screen. Therefore, the user may select a wireless device to be connected to the Internet from the list of the wireless devices displayed through the screen and may connect the selected wireless device to the Internet.

The AP 530 is a device that connects the wireless device 510, such as a Wi-Fi device, to a network, and may provide wireless access to the smart device 520 and the wireless devices 510. The AP 530 may provide wireless LAN security through authentication in a hotspot method in conjunction with the AAA server 540 such as the authentication server or radius. In the disclosure, an environment in which a hotspot is provided in the captive portal method through the authentication server is assumed, but the scope of rights of the disclosure is not limited thereto.

The AP 530 may include a wireless network module, a storage (device status storage), a traffic management module, an HTTP redirect module, an authentication management module, a device detection module, and a web server and filtering module. The web server may be embedded in the AP or may be externally located.

The storage may store a STA device status, such as whether the STA is authenticated, and the traffic management module may transmit traffic of the authenticated STA to the Internet according to whether the STA of the storage is authenticated when traffic of a new STA occurs and may transmit traffic of the unauthenticated STA to the HTTP redirect module. The HTTP redirect module may serve to deliver the URL of a web server to the unauthenticated STA. When the STA replies a message including ID and PW to the web server of the AP, the authentication management module of the AP may serve to perform user authentication with the authentication server, and may update and store information indicating whether the corresponding device is authenticated in the storage when authentication is successfully performed.

A specific operation of this will be described in FIG. 6A.

Figure 6A:
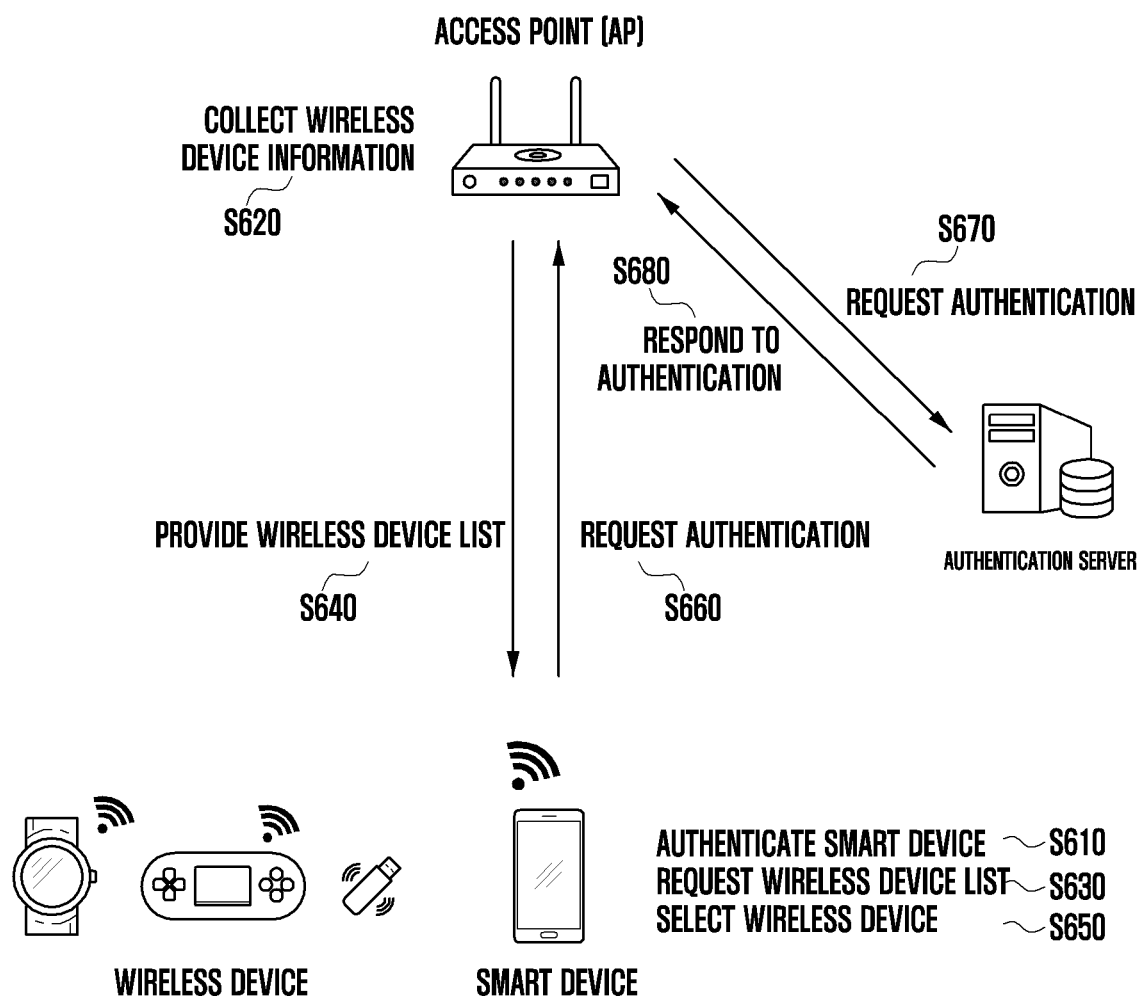
FIG. 6A is a diagram illustrating a process of authenticating a wireless device using a smart device according to an embodiment of the disclosure.

FIG. 6A is a diagram illustrating a process of authenticating a wireless device using a smart device according to an embodiment of the disclosure.

Referring to FIG. 6A, the smart device may perform authentication in the captive portal method and may store account information (e.g., ID or PW) used at the time of authentication in operation S610.

Alternatively, the smart device may store and have account information of the user in an application of a hotspot provider. Accordingly, the smart device may use the account information stored in the smart device or the application for authentication of the smart device or the wireless device.

Alternatively, the smart device may generate authentication information for accessing a wireless LAN using the account information.

For example, the smart device may store reservation information (e.g., room number booked at the time of hotel reservation), account information (e.g., the name of the reservation customer), and authentication information generated in advance according to authentication information generation rules (ID, PW generation and combination rules). That is, the smart device may generate authentication information using the user's account information (name, ID, or PW of the reservation customer) and the room number reserved at the time of booking the hotel, and may use the generated information to perform authentication of the smart device or the wireless device.

Alternatively, when the smart device executes the application, the application or the authentication server may map the user's account information and authentication information, and may perform authentication using the account information and mapping information transmitted by the smart device. In this case, authentication information may be generated in the server or the application by using the reserved room number, the authentication information generation rules, and the account information, and may determine that authentication is performed when the account information mapped to the authentication information is received.

Alternatively, the server that provides the application or the hotspot may generate authentication information using the user's account information (using the room number, authentication information generation rules, etc.) and may transmit the generated information to the smart device. The smart device may use the authentication information in order to authenticate the smart device or the wireless device.

Meanwhile, the account information and the authentication information may be the same (when the smart device or the application performs authentication using the account information, the account information may be authentication information).

The APs may collect information of the wireless devices through signals of the wireless devices (STAs) received through the wireless access module in operation S620, and the collected information may include STA identification information (e.g., MAC address, name, or type of the STA). The above-described STA identification information may include other information capable of identifying the wireless device in addition to the information described above. Further, as described later, the information of the wireless device may be collected in the smart device (when the smart device operates in the AP mode).

When the user executes the application of the smart device in order to access various wireless devices other than the smart device, the application of the smart device may request a list of wireless devices accessible to the AP in operation S630. Alternatively, the application may request the list of the wireless devices when a graphic object (authentication button) in the application is activated.

The AP may transmit the collected list of the wireless devices to the application in operation S640, and may select the wireless devices according to the proposed filtering method to constitute the list.

The application of the smart device may display the received list of the wireless devices to the user, and the user may select the desired wireless device in operation S650.

Accordingly, the smart device may transmit, to the AP, a message including the authentication information stored in the AP at the time of authenticating the smart device and identification information (e.g., MAC address) of the selected wireless devices, thereby making an authentication request in operation S660. The identification information of the wireless devices of the disclosure may include a variety of information in addition to the MAC address. For example, the identification information of the wireless devices may be composed of unique information (IMSI) of a terminal's SIM card.

Alternatively, the smart device may make the authentication request by transmitting the message including the account information or authentication information stored for authentication and the identification information (MAC address) of the selected wireless devices to the AP. The authentication information may be stored in advance or generated by the smart device using user information, and the detailed contents are the same as described above.

At this time, the AP of the wireless device may transmit the authentication information of the authentication request message to the authentication server to make the authentication request in operation S670, and the authentication server and may reply the authentication result to the AP in operation S680. When the authentication is successfully performed, the AP may update whether authentication for the MAC layer of the wireless device is performed and may allow Internet access.

An example of authenticating the wireless device using the smart device as described above will be described in FIG. 6B.

Figure 6B:
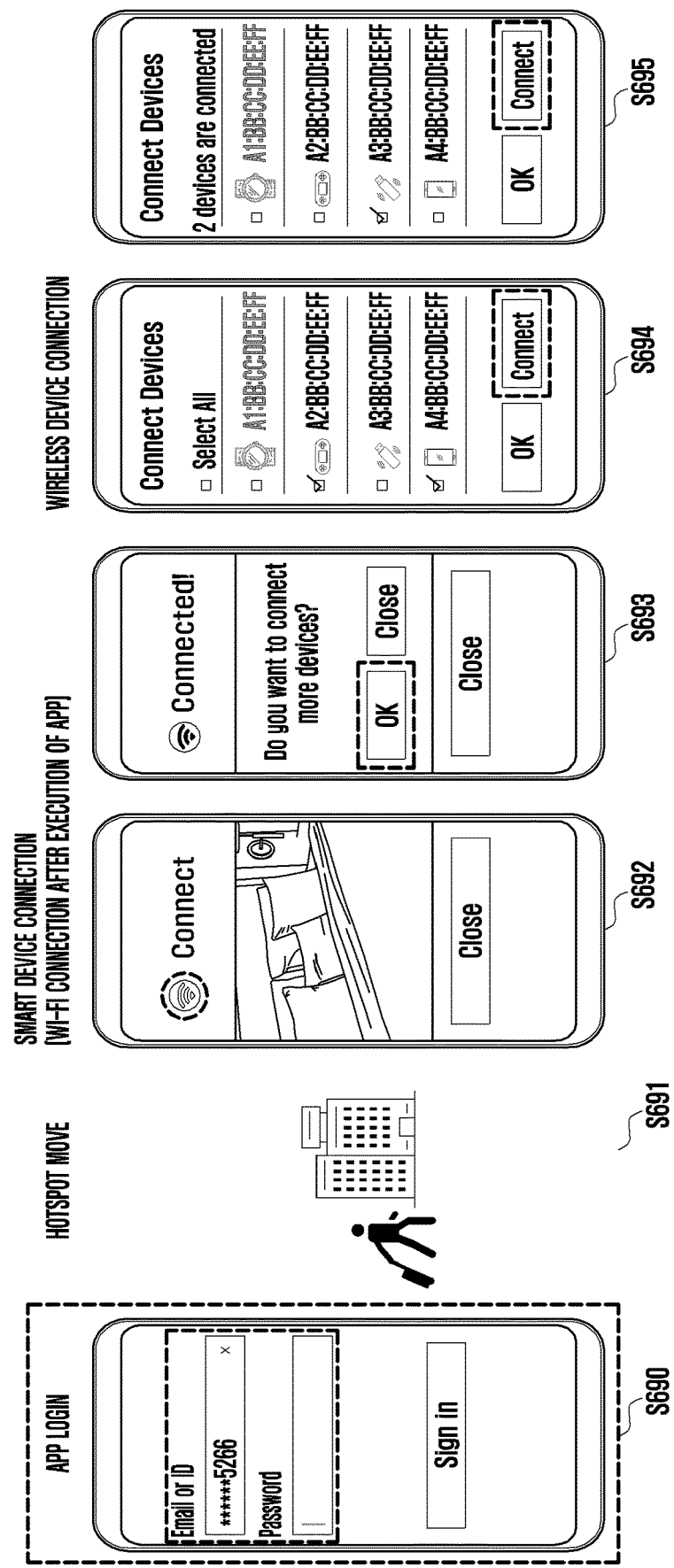
FIG. 6B is a diagram illustrating an example of authenticating a wireless device using a smart device according to an embodiment of the disclosure.

FIG. 6B is a diagram illustrating an example of authenticating a wireless device using a smart device according to an embodiment of the disclosure.

Referring to FIG. 6B, a user may log-in to an application of a hotspot provider (e.g., hotel, cafe, etc.) in operation S691. As described above, when the smart device performs authentication in advance using the captive portal method or logs in to the application, authentication may be performed using account information stored in the application or authentication information generated using the account information. The details of the authentication information are the same as described above, and will be omitted below.

In addition, after logging in to the application for the first time, user information may be stored so that the login can be performed automatically when the application is executed, and authentication of the smart device can also be performed automatically. Alternatively, the user may select whether to perform login or perform authentication using a graphic object in the application. However, whether to automatically perform login and perform authentication may be changed according to a user's configuration.

In operation S691, the smart device may move to a place where a hotspot can be provided.

Next, in operation S692, the application may be executed in the smart device, and wireless LAN access may be performed. At this time, when the graphic object of the application (wireless LAN connection button) is activated, the smart device may access the wireless LAN. At this time, the smart device may perform authentication using the above-described account information or authentication information, and the details of the account information and authentication information are the same as described above. In addition, after the initial authentication is performed, the authentication procedure may be omitted.

In addition, the smart device connected to the wireless LAN may determine whether another wireless device is connected to the wireless LAN. The smart device may display a screen for selecting whether to connect to the other wireless device in operation S693, or may be configured to automatically connect the other wireless device to the wireless LAN.

When it is determined to connect the other wireless device to the wireless LAN, the smart device may request a wireless device list from the AP and may receive the wireless device list from the AP. At this time, the list of the wireless devices may include at least one of the MAC address, device name, and type of the wireless device.

Accordingly, the smart device may display the received list of the wireless devices in operation S694, and the user can select a desired wireless device to connect the desired wireless device to the wireless LAN in operation S695. At this time, the smart device may make an authentication request by transmitting, to the AP, a message including the authentication information stored at the time of authenticating the smart device to the AP, the authentication information generated to authenticate the wireless device, and the identification information of the wireless device. The details are the same as described above, and will be omitted below.

In FIG. 6A, a method of authenticating the smart device in operation S610 may use an existing captive portal login method as shown in FIG. 2 through a web browser embedded in the smart device or a web browser embedded in the application. Also, a method using a smart device application may be used. A process of the captive portal authentication method using the smart device application will be described in FIG. 7.

Figure 7:
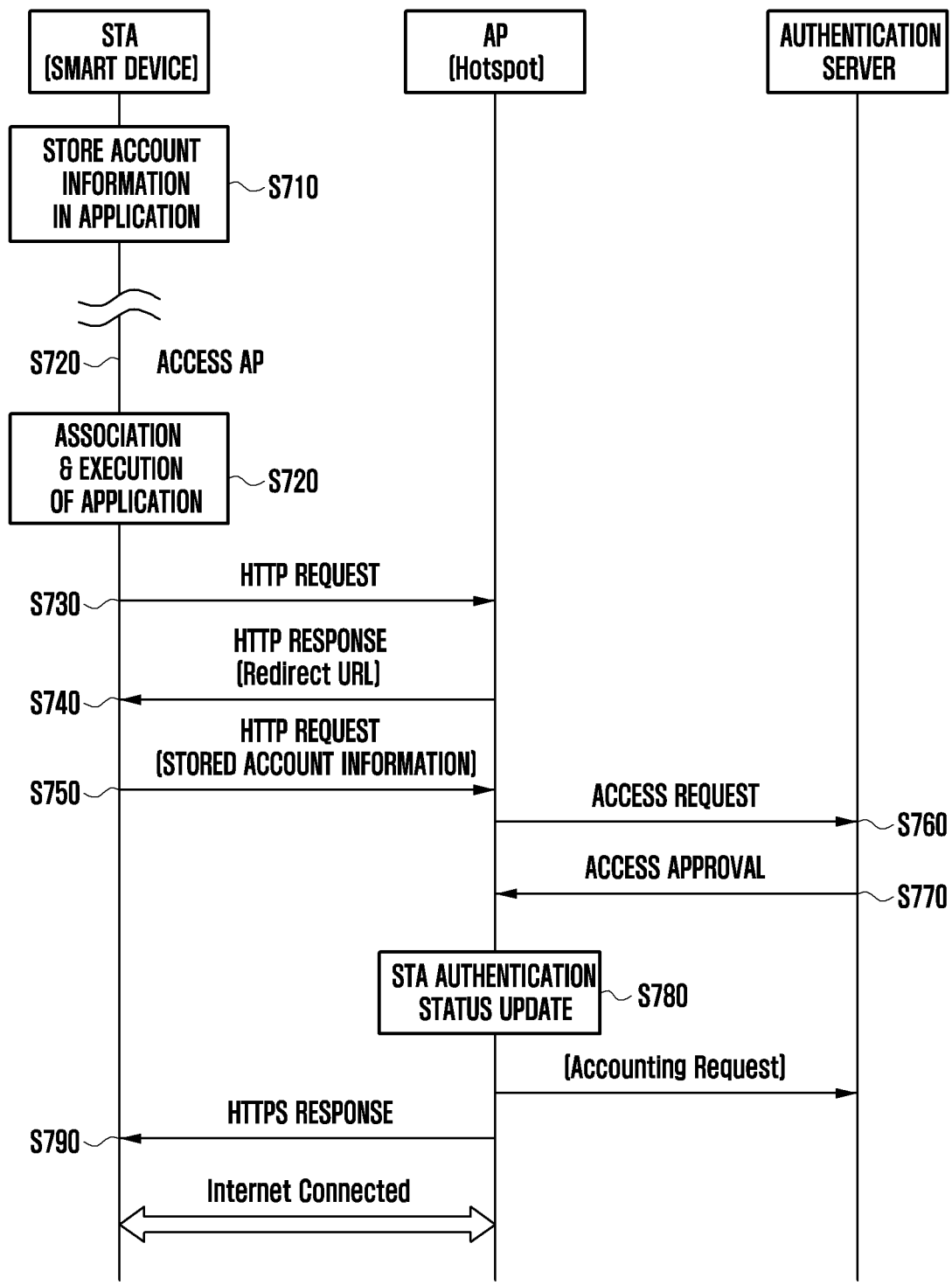
FIG. 7 is a diagram illustrating an authentication method using a smart device application according to an embodiment of the disclosure.

FIG. 7 is a diagram illustrating an authentication method using a smart device application according to an embodiment of the disclosure.

Referring to FIG. 7, the smart device may store account information or authentication information for performing authentication in the application in a captive portal method in advance in operation S710. The method of storing the account information in advance includes a method of manually registering the account information by a user and a method of automatically obtaining the account information at the time of logging in the application using a hotel or business service account. Alternatively, the authentication information may be generated and stored using the account information as described above, or a mapping relationship between the account information and the authentication information may be used. The details are the same as described above.

When a wireless LAN service is to be used in a hotspot area later, the application may be executed in the smart device to connect (associate) to a hotspot AP in operation S720. When connecting to the hotspot AP, a wireless LAN connection function provided by the smart device may be operated or the wireless LAN connection function may be executed in the application for connection.

When the smart device is connected to the AP, the application may automatically transmit an HTTP request message to an arbitrary web page in operation S730. At this time, the AP may respond by adding a captive portal URL of the web server to an HTTP redirect message (e.g. HTTP 302 found message) in operation S740 in the same manner as the existing captive portal authentication method. At this time, the application may transmit the HTTPS request (HTTPS post) by entering the stored account information into the captive portal URL in operation S750, and the AP may transmit the received account information to the authentication server using an access request message in operation S760 and may receive information indicating whether authentication is performed in operation S770.

When authentication is successfully completed, the AP may update an approval status of the STA in operation S780, and may allow the smart device to access the Internet without redirecting any more. If necessary, the AP may confirm data usage statistics for each user for the purpose of billing or the like by transmitting the accounting request message to an authentication server (authentication, authorization, accounting server {AAA server}). In addition, the AP may transmit an HTTPS response to the STA in operation S790. Through this method, the smart device can be easily connected to the Internet without changing the existing captive portal process.

Figure 8:
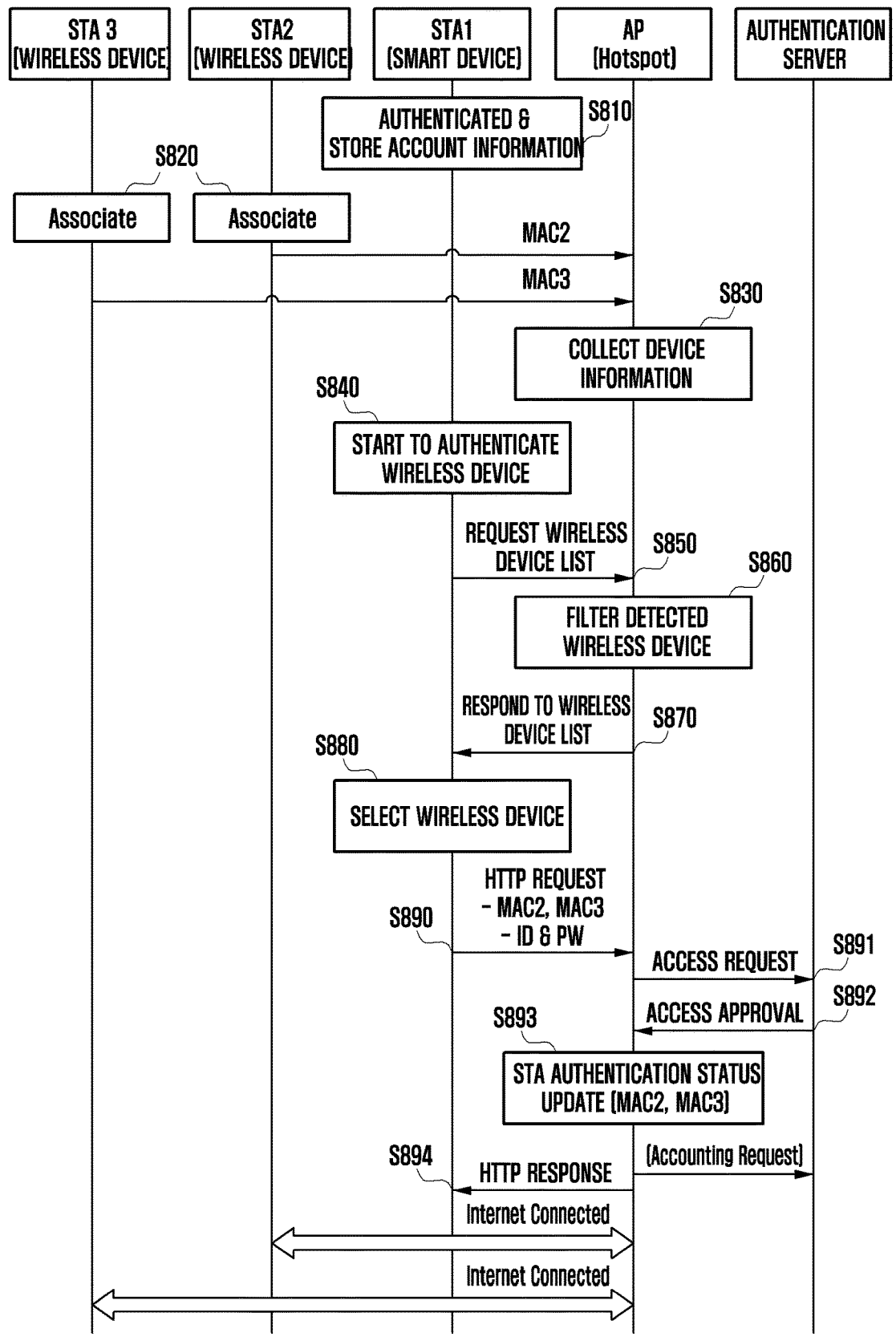
FIG. 8 is a flowchart illustrating a specific method of authenticating a wireless device according to an embodiment of the disclosure.

Meanwhile, the method of authenticating the wireless device described in the above-described drawings is the same as that in FIG. 8.

FIG. 8 is a flowchart illustrating a specific method of authenticating a wireless device according to an embodiment of the disclosure.

Referring to FIG. 8, a STA 1 that is a smart device may be authenticated by the above-described method in operation S810 and authentication information (e.g., captive portal ID and password) may be stored in an application.

A STA 2 and a STA 3, which are wireless devices, may be connected to an AP in S820. At this time, the AP may collect identification information (e.g., MAC address) of wireless devices in operation S830. In addition, the AP may store identification information of the wireless devices. The STA 2 and STA 3 are not yet authenticated.

In an environment in which there are multiple APs having the same SSID (e.g., a hotel), each AP may transmit unauthenticated device information connected to itself to neighboring APs to share identification information (e.g., MAC address) of the unauthenticated devices, thereby allowing the smart device to authenticate an unauthenticated device connected to another AP as well as the AP to which the smart device is connected.

Next, when a function of authenticating the wireless device is executed in the application of the smart device in operation S840, the smart device may transmit a message requesting a list of the wireless devices to the AP in operation S850. The function of authenticating the wireless device may be used in the same sense as a function of connecting the wireless device to a wireless LAN.

The AP may perform a filtering process on the detected wireless device in operation S860, and may then transmit, to the smart device, a list of wireless devices that are likely to have the same owner as the smart device in operation S870. The AP may transmit the list of all the wireless devices by omitting the filtering process.

The smart device may display the received list in the application, and may select a wireless device to be authenticated among the displayed devices in operation S880. However, embodiments of the disclosure are not limited thereto, and the list may be displayed on a web page. However, the selection operation may be omitted, and the smart device may request authentication for all the devices included in the list received from the AP.

Meanwhile, a user may pre-register the list of the wireless devices. In this case, at least one of operations of requesting the list of the wireless devices by the smart device, performing filtering by the AP, and receiving the list of the wireless devices may be omitted, and the smart device may display the list of the accessible wireless devices and may select the wireless device to be authenticated.

However, the smart device may display a list of some wireless devices by performing the following filtering process from the list of the wireless devices registered in advance.

The list of the wireless devices including the wireless device's identifier information (e.g., MAC information) may be stored in advance and displayed after receiving user input, and information of the devices matching the list of the wireless devices received from the AP may be separately displayed. At this time, a method of selecting the wireless device may use a method of sequentially displaying each wireless device and asking whether the corresponding device is the device to be authenticated and a method of displaying the list of the wireless devices and selecting one or more wireless devices. In addition, the smart device may select the wireless device selected by the user or select the wireless device according to a predetermined condition.

Next, the smart device may allow the authentication information (e.g., ID or PW) and the MAC address of the wireless device desired to be authenticated to be included in the HTTPS request, and may transmit the HTTPS request in operation S890. A method for generating the authentication information is the same as described above.

The AP may receive the HTTPS request message, may transmit an authentication request message to the authentication server in operation S891, and may receive a response message for the authentication request in operation 892. When the authentication is accepted, the AP may update authentication status information in operation S893, and may transmit an HTTPS response message to the smart device in operation S894.

Since then, the Internet of each wireless device (STA 2 or STA 3) becomes possible. When requesting authentication of one or more wireless devices, the authentication request and acceptance process may be performed at one time or sequentially.

If necessary, the AP may confirm data usage statistics for each user for the purpose of such as billing by transmitting an accounting request message to the AAA server.

Figure 9:
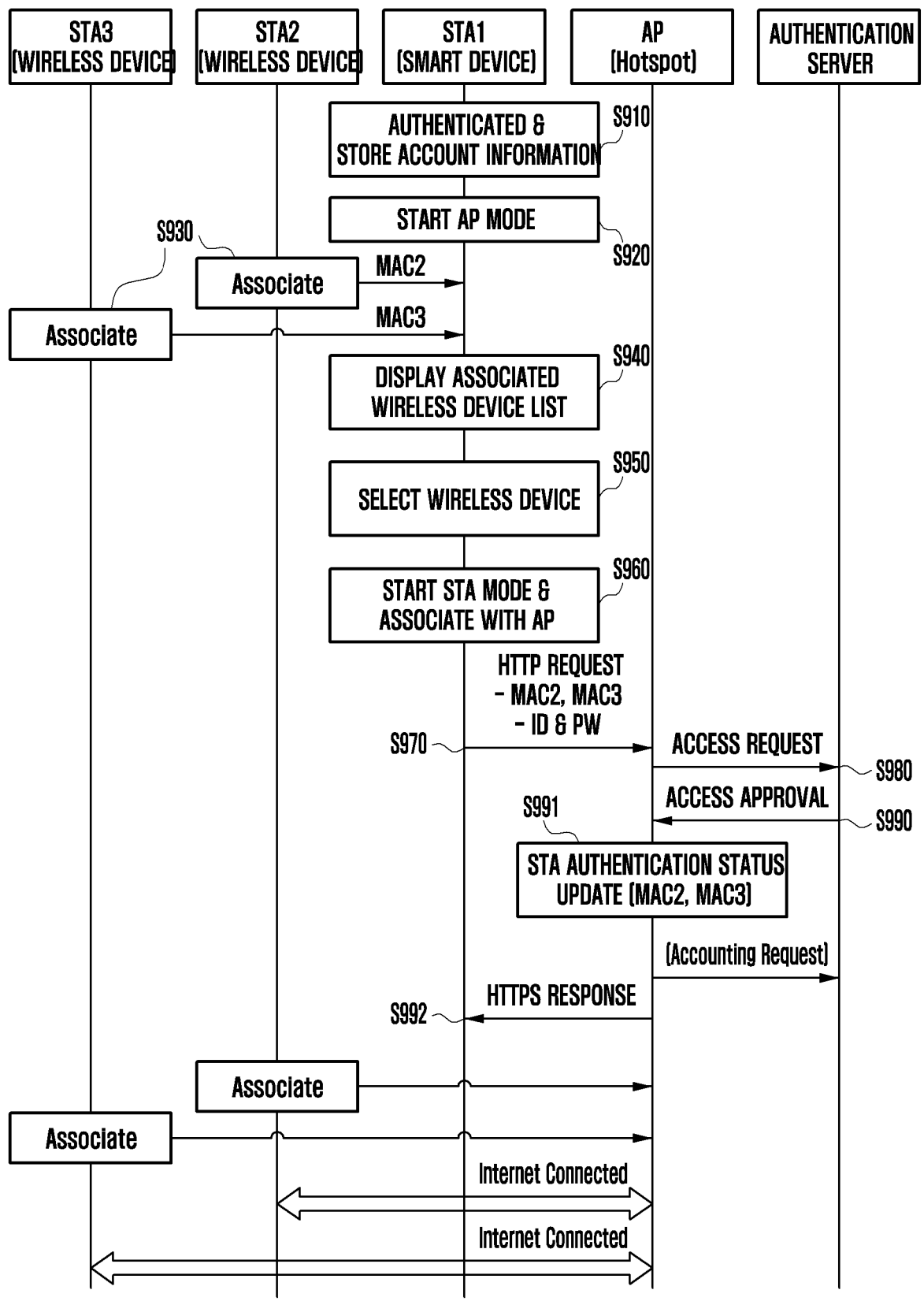
FIG. 9 is a flowchart illustrating another method of authenticating a wireless device according to an embodiment of the disclosure.

FIG. 9 is a flowchart illustrating another method of authenticating a wireless device according to an embodiment of the disclosure.

Referring to FIG. 9, a STA 1 that is a smart device may be authenticated in the above-described method in operation S810, and account information (e.g., captive portal ID and password) or authentication information may be stored in an application.

Next, the smart device may start an AP mode in operation S920. The AP mode may be started according to a user's selection or may be automatically started. Further, a STA 2 and a STA 3 which are wireless devices may be connected (associated) to the smart device in operation S930. In this case, the smart device may receive a signal transmitted from the wireless device and may collect identification information (e.g., MAC address) of the wireless devices.

Next, when other wireless devices are desired to be connected to the wireless LAN, the smart device may display a list of associated wireless devices in operation S940. The list of the wireless devices may be displayed in the application or a web page. Further, the selecting operation may be omitted, and the smart device may request authentication for all the devices included in the list received from the AP.

Meanwhile, a user may pre-register the list of the wireless devices. In this case, an operation of collecting the identification information of the wireless devices by starting the AP mode by the smart device may be omitted, and the smart device may display the list of accessible wireless devices and may select a wireless device to be authenticated.

However, the smart device may display a list of some wireless devices by performing the following filtering process from the list of the wireless devices registered in advance.

Next, the smart device may select the wireless device in operation S950. The method of selecting the wireless device may use a method of sequentially displaying each wireless device and asking whether the corresponding device is the device to be authenticated, and a method of displaying the device list and selecting one or more wireless devices. Also, the smart device may select the wireless device selected by the user or the wireless device according to a predetermined condition.

Next, the smart device may start a STA mode and may be associated with the AP in operation S960. Next, the smart device may allow authentication information (e.g., ID or PW) and MAC address of the wireless device to be authenticated to be included in the HTTPS request and may transmit the HTTPS request in operation S970. The method of generating the authentication information is the same as described above.

The AP may receive the HTTPS request message, may transmit an authentication request message to the authentication server in operation S980, and may receive a response message to the request in operation S990. When the authentication is accepted, the AP may update authentication status information in operation S991, and may transmit an HTTPS response message to the smart device in operation S992.

Since then, the Internet of each wireless device (STA 2 or STA 3) becomes possible. When requesting authentication of one or more wireless devices, the authentication request and acceptance process may be performed at one time or sequentially.

If necessary, the AP may confirm data usage statistics for each user for the purpose such as billing by transmitting an accounting request message to the AAA server.

Meanwhile, as a method of filtering only some of the detected wireless devices, for example, the following method may be used.

1) Time-based wireless device filtering,
2) Received signal strength indicator (RSSI) pattern similarity-based wireless device filtering,
3) Authentication history DB-based wireless devices filtering The operation of the time-based wireless device filtering method will be described in FIG. 10.

The filtering method described in the disclosure may be used in the smart device or the AP. Hereinafter, a method of filtering the wireless device by the AP will be described as an example, but the same method may be used in the smart device.

Figure 10:
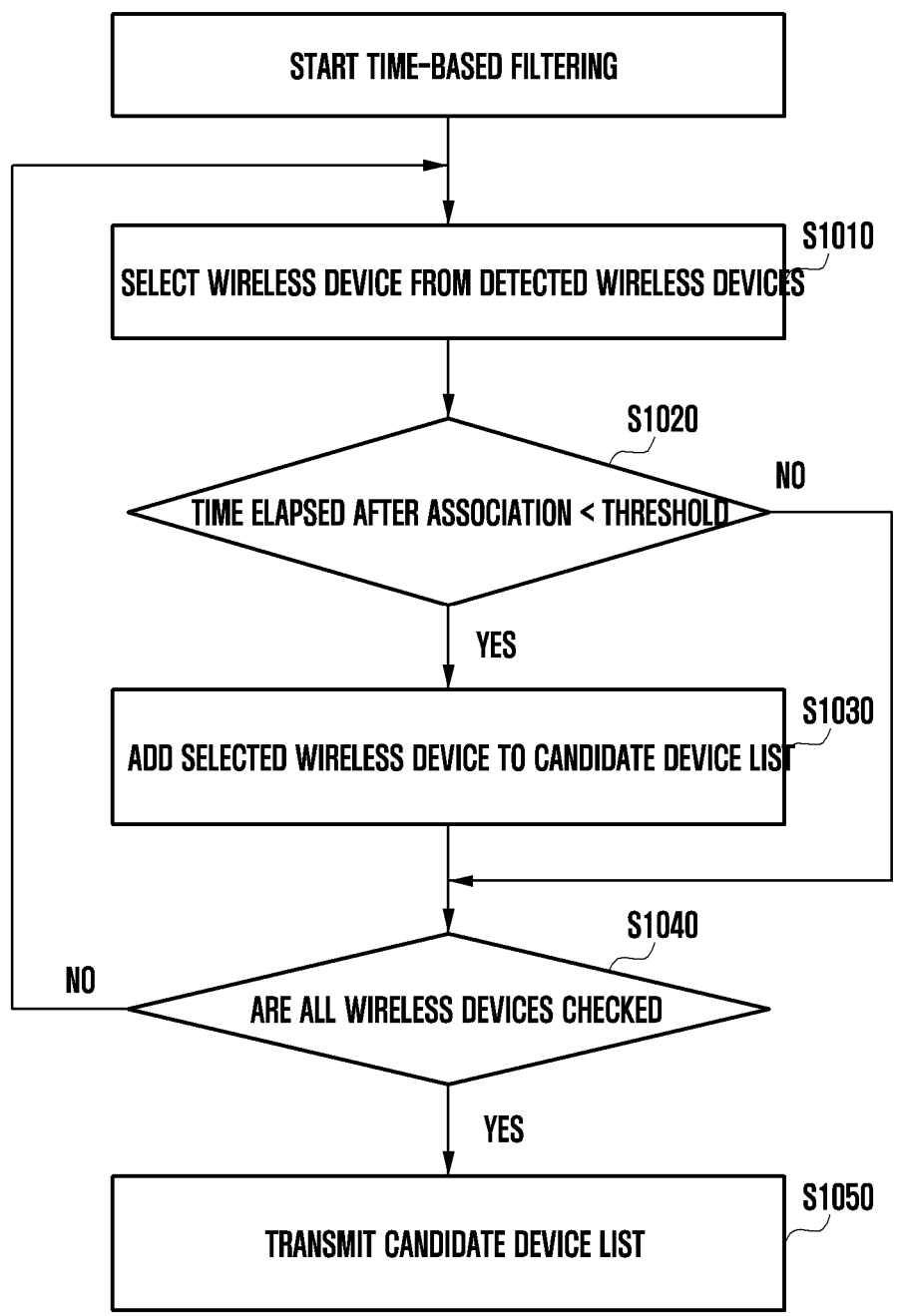
FIG. 10 is a diagram illustrating a method of filtering a time-based wireless device according to an embodiment of the disclosure.

FIG. 10 is a diagram illustrating a method of filtering a time-based wireless device according to an embodiment of the disclosure.

The AP may select one of detected wireless devices in operation S1010.

Next, the AP may check (confirm) whether the time elapsed after the wireless device is associated with the AP is less than a specific threshold in operation S1020.

When the time elapsed after the wireless device is associated with the AP is less than the threshold, the AP may add the wireless device to a candidate device list in operation S1030. The AP may repeat the above process until all detected wireless devices are checked in operation S1040, and may transmit the candidate device list to the smart device in operation S1050 when all the wireless devices are checked.

Meanwhile, when the smart device performs a filtering process, operation S1050 may be omitted.

The operation of the RSSI pattern similarity-based wireless device filtering method will be described in FIG. 11.

Figure 11:
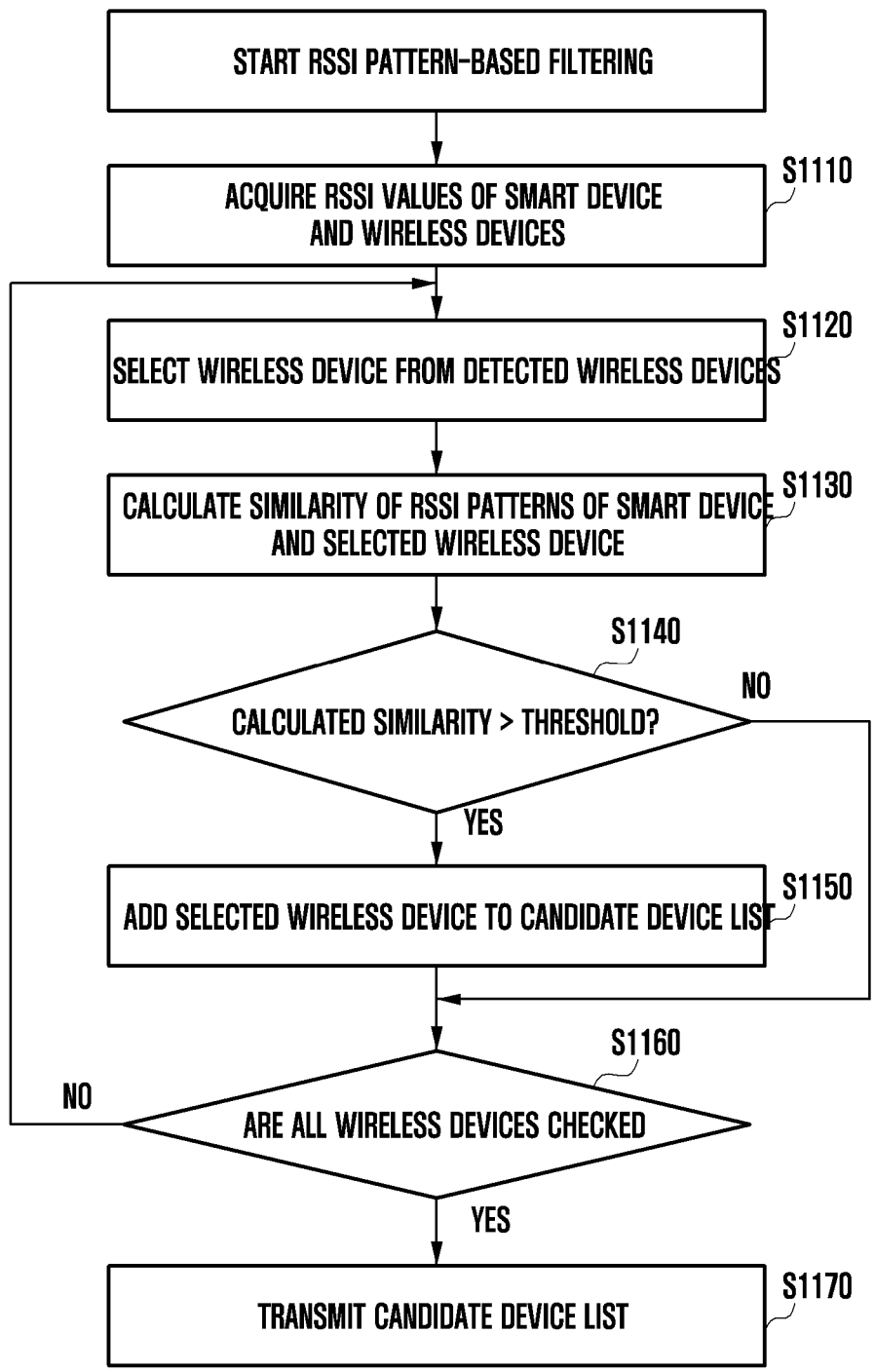
FIG. 11 is a diagram illustrating a filtering method based on a received signal strength indicator (RSSI) pattern similarity according to an embodiment of the disclosure.

FIG. 11 is a diagram illustrating a filtering method based on a RSSI pattern similarity according to an embodiment of the disclosure.

The AP may acquire RSSI values of a smart device and detected wireless devices from neighboring APs to generate a RSSI pattern in operation S1130.

The collected RSSI values may be made in the form of vector using the AP number as index and may be defined as one RSSI pattern. Meanwhile, the RSSI may be measured by a terminal and transmitted to the AP, and the RSSI pattern may be generated according to the RSSI.

Next, the AP may select one of the detected wireless devices in operation S1120 and may calculate the similarity of the RSSI pattern with the smart device in operation S1130. In general, the similarity of the RSSI pattern is increased as the AP is closer to the smart device. As a pattern similarity index (indicator), an existing vector similarity index such as cosine similarity can be used.

The AP may check whether the similarity of the RSSI pattern with the smart device is greater than a specific threshold in operation S1140, and may add the wireless device having the similarity greater than the threshold to the candidate device list in operation S1150. The above process may be repeated until all the detected wireless devices are checked in operation S1160, and the candidate device list may be transmitted to the smart device in operation S1170 when all the wireless devices are checked.

The above-described method can also be used in the smart device. When the smart device performs filtering using the similarity of the RSSI pattern, the similarity between a pattern of a signal received by the smart device and the RSSI pattern of the detected wireless devices may be compared, and the detailed contents are as described above. In addition, when the smart device performs filtering, operation S1170 may be omitted. Alternatively, the smart device may perform filtering using the strength of the signal received from the wireless device. For example, the smart device may filter the wireless devices whose received signal strength exceeds the threshold value.

In addition, the threshold value for comparing the similarity of the RSSI pattern may be determined differently when the smart device performs filtering and when the AP performs filtering, and may be configured in advance.

In addition, the threshold value may be configured in various ways.

Figure 12:
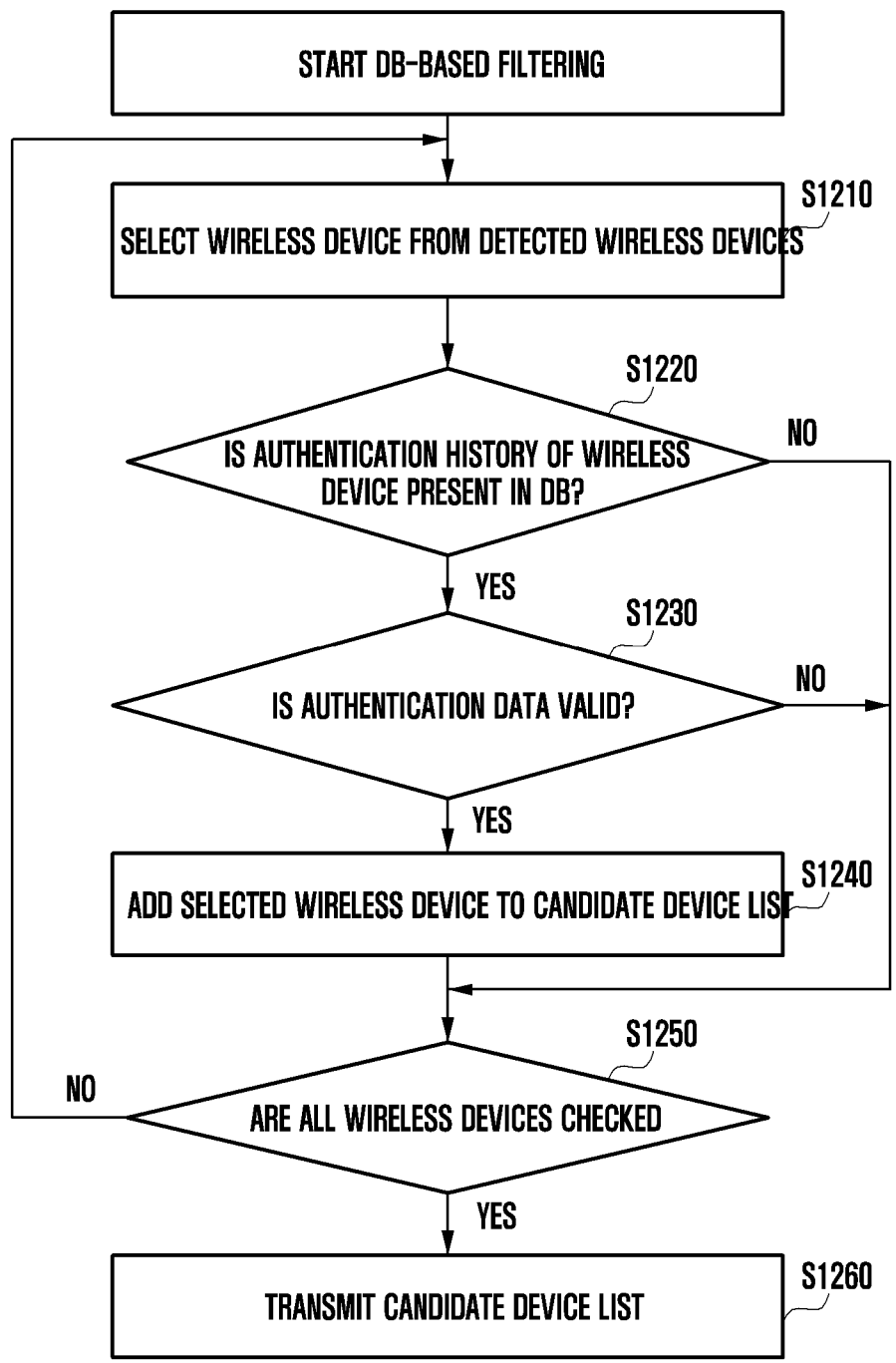
FIG. 12 is a diagram illustrating a filtering method based on an authentication history DB according to an embodiment of the disclosure.

Meanwhile, the operation of the method of filtering the wireless device based on the authentication history DB is shown in FIG. 12.

FIG. 12 is a diagram illustrating a filtering method based on an authentication history DB according to an embodiment of the disclosure.

An AP may select one wireless device among detected wireless devices in operation S1210 and may identify whether the authentication history of the corresponding device is in the DB in operation S1220.

When the authentication history is in the DB, the AP may identify whether the authentication information used at the time of the corresponding connection is valid in operation S1230. The validation may be performed through a validity period, account information, etc.

When the authentication information is valid, the wireless device may be added to the candidate device list in operation S1240. The above process may be repeated until all the detected wireless devices are checked in operation S1250, and the candidate device list may be transmitted to the smart device in operation S1260 when all the wireless devices are checked.

Meanwhile, when the smart device performs a filtering process, operation S1050 may be omitted.

Each of the methods of filtering the wireless devices described above may be used in combination. A final candidate device list may be obtained through two or more intersections or unions of three candidate device terminal lists obtained by each method. For example, devices in which the time elapsed after connection through the intersection of the candidate device list obtained by the time-based filtering and the candidate device list obtained by the RSSI pattern similarity-based filtering is shorter than the threshold value while having a high RSSI pattern similarity with the smart device may be obtained as the candidate device list.

Figure 13A:
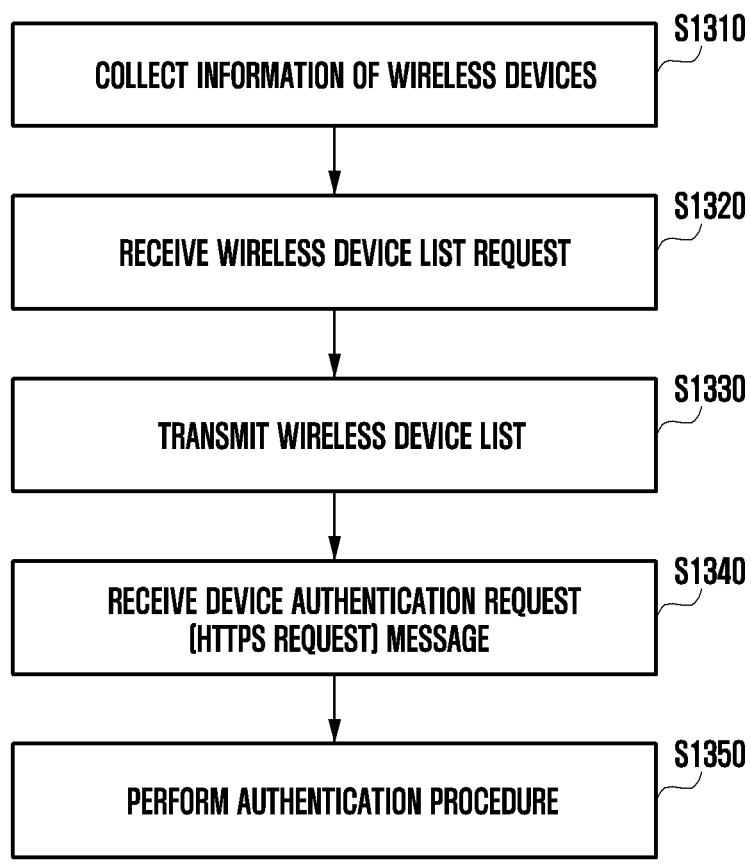
FIG. 13A is a diagram illustrating the operation of an AP according to an embodiment of the disclosure.

FIG. 13A is a diagram illustrating the operation of an AP according to an embodiment of the disclosure.

When wireless devices enter a hotspot area provided by the AP, the AP may be associated with the wireless devices. Accordingly, the AP may receive signals from the associated wireless devices and may collect information of the wireless devices in operation S1310.

Next, the AP may receive a request for a list of wireless devices in operation S1320. When an authentication process of the wireless device is started in the smart device, the AP may receive the request for the list of wireless devices from the smart device.

Next, the AP may transmit the wireless device list to the smart device through filtering on the detected wireless devices in operation S1330. At this time, the filtering process may be omitted, and the AP may transmit the list of all the detected wireless devices to the smart device.

Next, the AP may receive a device authentication request (HTTPS request) message from the smart device in operation S1340. The device authentication request message may include information on wireless devices to be authenticated and account information or authentication information used to authenticate the smart device.

Accordingly, the AP may perform an authentication procedure using the information in operation S1350. The details of the AP performing the authentication procedure are the same as described above, and will be omitted below. In addition, according to the authentication result, the AP may update the authentication status of the smart device and connect the wireless device to the Internet.

Figure 13B:
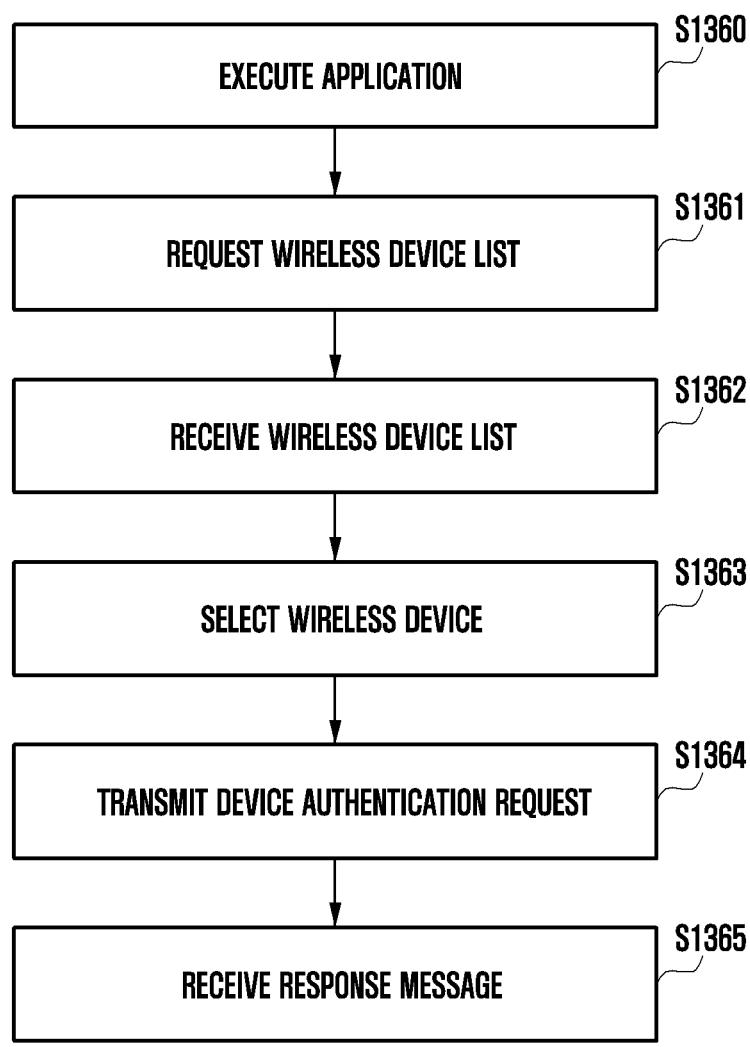
FIG. 13B is a diagram illustrating the operation of a smart device according to an embodiment of the disclosure.

FIG. 13B is a diagram illustrating the operation of a smart device according to an embodiment of the disclosure.

The smart device may execute an application in operation S1360. As described above, the smart device may complete authentication through a captive portal method or when an application is executed. In addition, the smart device may store account information or authentication information used for authentication. Details are the same as described above, and will be omitted below.

When the application is executed, it may be automatically logged in using previously stored information, or may be logged in through user input, and details are the same as described above.

Next, the smart device may start authentication of the wireless device. At this time, the smart device may display a screen for selecting whether another wireless device is connected to the wireless LAN, or may be configured to automatically connect another wireless device to the wireless LAN.

When the authentication starts to connect the wireless device to the wireless LAN, the smart device may request a list of wireless devices from the AP in operation S1361, and may receive a wireless device list from the AP in operation S1362. At this time, the list received from the AP may be a result filtered by the AP. Alternatively, a list of all wireless devices detected by the AP may be received and the smart device may perform filtering. The details are the same as described above.

Next, the smart device may select a wireless device to be connected in operation S1363. Next, the smart device may transmit a wireless LAN device authentication request to the AP in operation S1364. At this time, the wireless LAN access request may include account information used for authentication of the smart device and identification information of the wireless devices.

In addition, the smart device may receive a response message to the request in operation S1365. When the authentication is completed, the wireless device may be connected to the Internet.

Figure 14A:
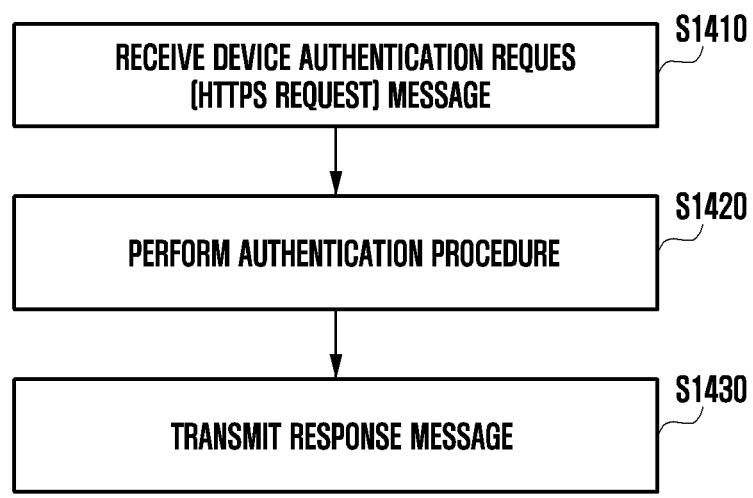
FIG. 14A is a diagram illustrating another operation of an AP according to an embodiment of the disclosure.

FIG. 14A is a diagram illustrating another operation of an AP according to an embodiment of the disclosure.

In this embodiment, the smart device may detect identification information of a wireless device that can access the AP. In this case, a process of collecting information of the wireless device described in FIG. 13A and transmitting a list of wireless devices to the smart device may be omitted.

Accordingly, the AP may receive a device authentication request (HTTPS request) message including identification information of wireless devices to be connected to the wireless LAN and account information or authentication information used for authentication of the smart device in operation S1410.

Accordingly, the AP may perform an authentication procedure in operation S1420 and may update the authentication status of the smart device according to the authentication result.

Next, the AP may transmit a response message (HTTPS response) to the device authentication request to the smart device in operation S1430.

When the authentication is completed, the wireless devices may be associated with the AP and may be connected to the Internet. However, the time when the wireless devices are associated with the AP may be any one of the time when the authentication is completed from the time when the smart device exits the AP mode.

Figure 14B:
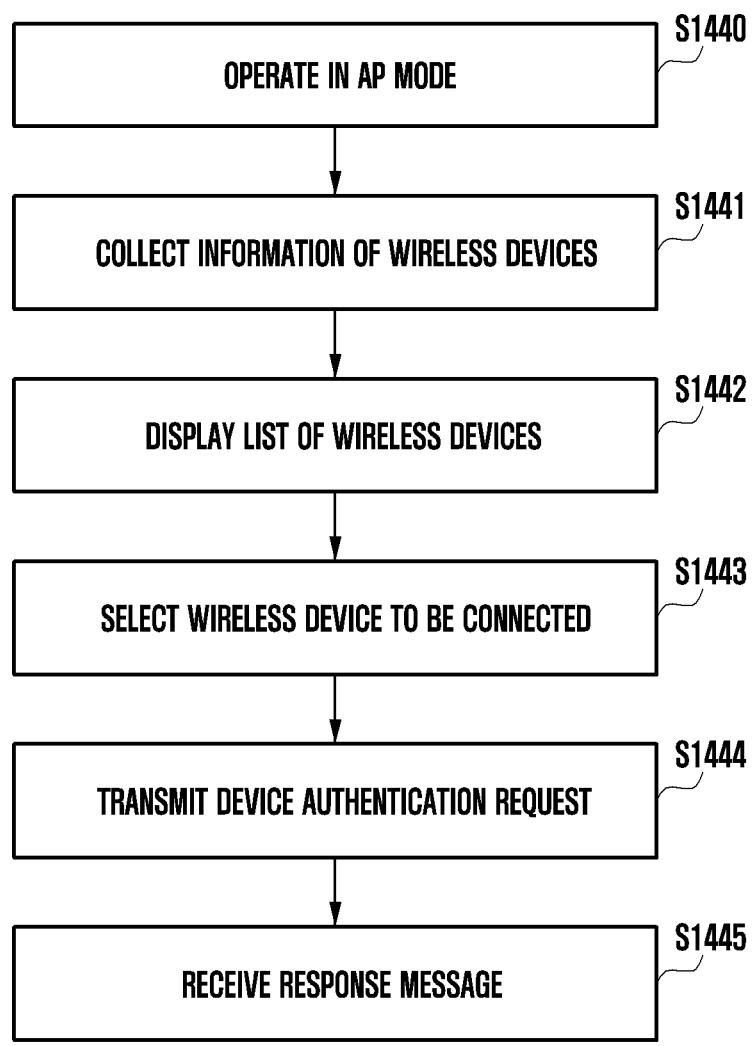
FIG. 14B is a diagram illustrating another operation of a smart device according to an embodiment of the disclosure.

FIG. 14B is a diagram illustrating another operation of a smart device according to an embodiment of the disclosure.

This embodiment describes the operation of the smart device when the smart device uses a method of collecting identification information of the wireless device.

The smart device may be authenticated in the manner described above. Details are omitted. Next, when the connection menu of the wireless device is selected in the application of the smart device, the smart device may operate in the AP mode in operation S1440. At this time, the AP mode may be automatically started, or the user can directly set the AP mode.

Accordingly, the wireless devices may be associated with the smart device, and the smart device may collect information of the wireless devices in operation S1441.

Next, the smart device may display a list of collected wireless devices in operation S1442. At this time, the smart device may display the list of all the wireless devices, or a list of some wireless devices through filtering.

Next, the smart device may select a wireless device to be connected in operation S1443, and may start the STA mode. Next, the wireless device may transmit a device authentication request to the AP in operation in S1444. At this time, the device authentication request may include account information used for authentication of the smart device and identification information of the wireless devices.

In addition, the smart device may receive a response message to the request in operation S1445. When the authentication is completed, the wireless device can be connected to the Internet.

Figure 15:
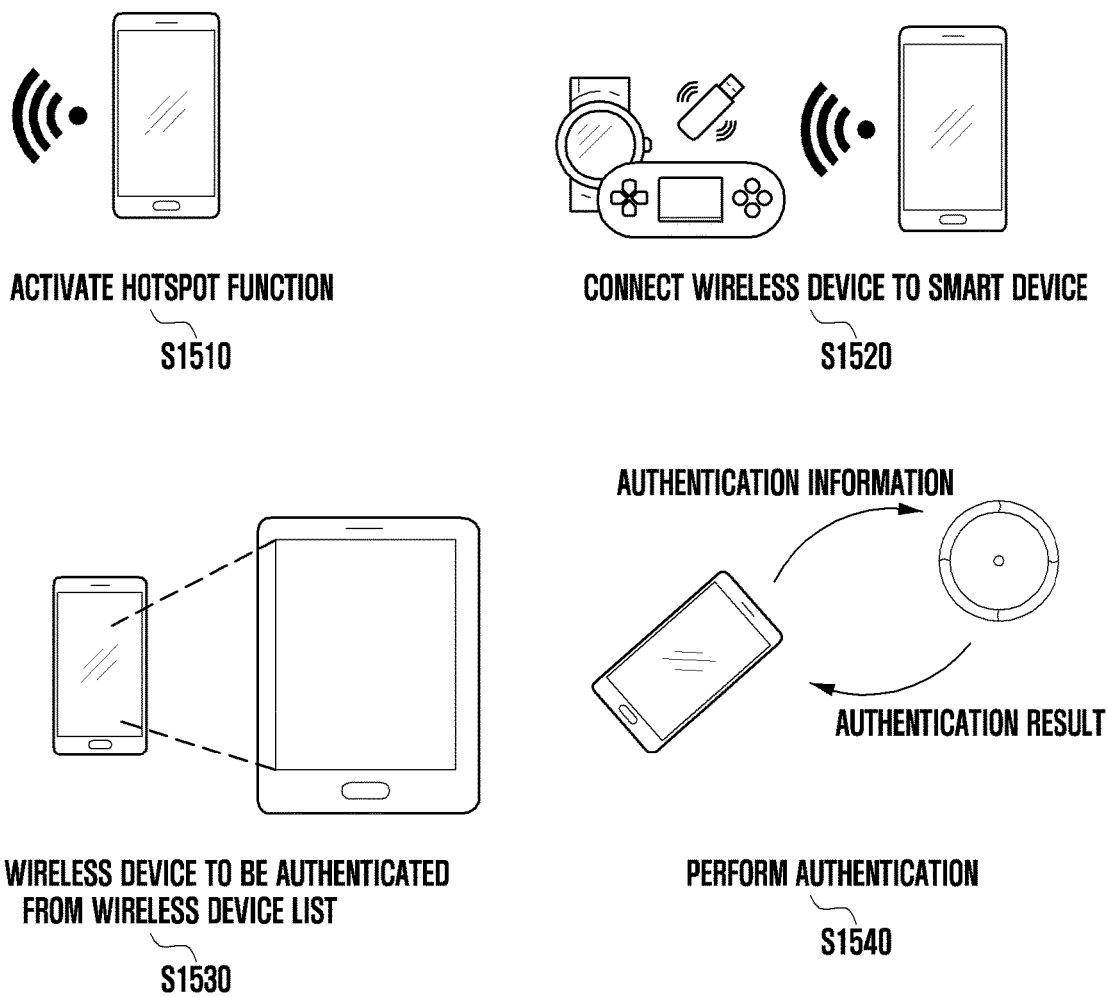
FIG. 15 is a diagram illustrating a method of authenticating a wireless device according to an embodiment of the disclosure.

FIG. 15 is a diagram illustrating a method of authenticating a wireless device according to an embodiment of the disclosure.

Referring to FIG. 15, the smart device may be authenticated by the above-described method. Next, when the connection menu of the wireless device is selected in the application of the smart device, the hotspot function of the smart device may be automatically activated in operation S1510.

Next, the wireless device may be connected to the smart device in operation S1520. The wireless device may be connected to the smart device through the hotspot function of the smart device. At this time, the wireless device may be connected to the smart device under the control of the user, or, if the wireless LAN connection function is activated, may be automatically connected to the smart device according to the activation of the hotspot function of the smart device.

Next, the smart device may select a wireless device to be authenticated from the list of connected wireless devices in operation S1530. At this time, the smart device may display the list of the wireless devices so that the user can select the wireless device. Alternatively, the wireless device may be selected according to a predetermined method.

Accordingly, the smart device may perform authentication by transmitting the authentication information of the selected wireless device to the AP in operation S1540.

The method described in FIG. 15 is similar to the method described in FIG. 9, and the method described in FIG. 9 may be applied.

Figure 16:
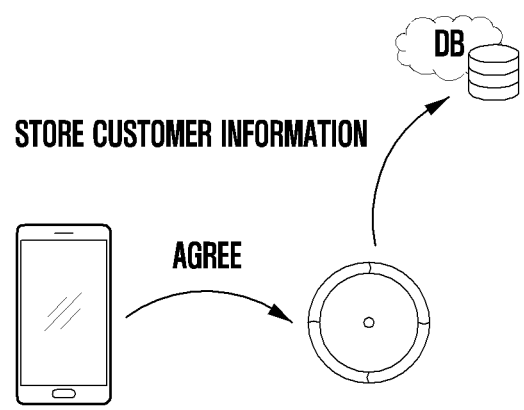
FIG. 16 is a diagram illustrating another method of authenticating a wireless device according to an embodiment of the disclosure.
Figure 16:
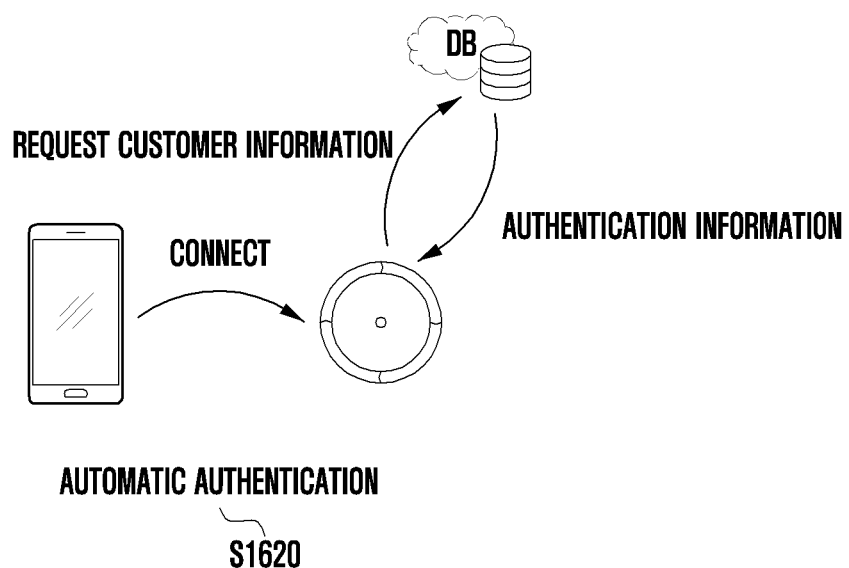

FIG. 16 is a diagram illustrating another method of authenticating a wireless device according to an embodiment of the disclosure.

Referring to FIG. 16, when authentication of a smart device or a wireless device is completed, authentication information used for authentication may be stored in a DB of a wireless LAN service provider. At this time, whether the authentication information is stored may be determined by a user's selection.

Next, when the smart device or the wireless device reconnects, the AP may automatically perform authentication by searching for the corresponding authentication information from the DB in operation S1620.

Figure 17:
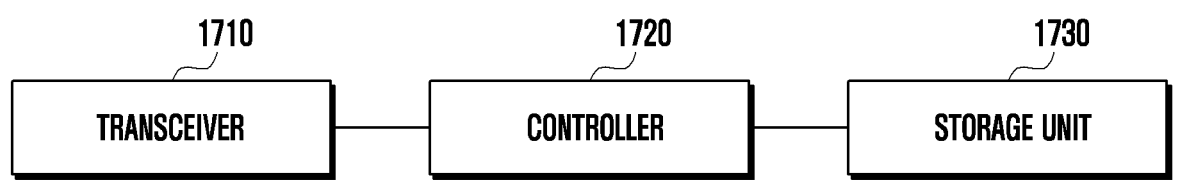
FIG. 17 is a diagram illustrating the structure of an AP according to an embodiment of the disclosure.

FIG. 17 is a diagram illustrating the structure of an AP according to an embodiment of the disclosure.

Referring to FIG. 17, an AP may include a transceiver 1710, a controller 1720, and a storage unit 1730. In the disclosure, the controller may be defined as a circuit, an application specific integrated circuit, or at least one processor.

The transceiver 1710 may transmit and receive signals. For example, the transceiver 1710 may receive a signal from a smart device or a wireless device, may transmit an authentication request message to an authentication server, and may receive a response message thereto.

The controller 1720 may control the overall operation of the AP proposed in the disclosure. The controller 1720 may control a signal flow between blocks to perform the operations according to the flowchart described above.

The AP of the disclosure may further include the configurations proposed in FIG. 5 (e.g., a traffic management module, an authentication management module, a device detection and filtering module, etc.), and the controller 1720 may control the configurations to perform the operations of the disclosure.

The storage unit 1730 may store at least one piece of information transmitted and received through the transceiver 1710 and information generated through the controller 1020.

Figure 18:
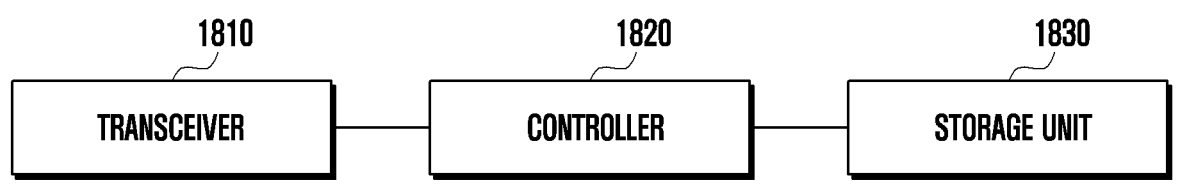
FIG. 18 is a diagram illustrating the structure of a smart device according to an embodiment of the disclosure.

FIG. 18 is a diagram illustrating the structure of a smart device according to an embodiment of the disclosure.

Referring to FIG. 18, the smart device may include a transceiver 1810, a controller 1820, and a storage unit 1830. In the disclosure, the controller may be defined as a circuit, an application specific integrated circuit, or at least one processor.

The transceiver 1810 may transmit and receive signals. For example, the transceiver 1820 may request authentication of the wireless device from an AP and may receive a response thereto.

The controller 1820 may control the overall operation of the terminal proposed in the disclosure. The controller 1820 may control a signal flow between blocks to perform the operations according to the flowchart described above. The smart device of the disclosure may include the configurations proposed in FIG. 5 (e.g., a display, a user interface, etc.), and the controller 1820 may control the above configurations to perform the operation of the disclosure.

In addition, the storage unit 1830 may store at least one piece of information transmitted and received through the transceiver 1810 and information generated through the controller 1820.

The embodiments of the disclosure described and shown in the specification and the drawings have been presented to easily explain the technical contents of the embodiments of the disclosure and help understanding of the embodiments of the disclosure, and are not intended to limit the scope of the embodiments of the disclosure. Therefore, the scope of various embodiments of the disclosure should be construed to include, in addition to the embodiments disclosed herein, all changes and modifications derived on the basis of the technical idea of the disclosure.

The invention claimed is:

1. A method of an access point (AP) in a communication system, the method comprising:
obtaining information on at least one first wireless device,
based on at least one of information on at least one wireless device associated with the AP or information on at least one wireless device associated with a neighboring AP, the information on the at least one wireless device associated with the neighboring AP includes a received signal strength indicator (RSSI);

receiving, from a terminal, a request message for a list of wireless devices, the terminal being authenticated by the AP;

calculating an RSSI pattern of the at least one first wireless device based on the information on the at least one first wireless device;

as a response to the request message, filtering the at least one first wireless device to identify at least one second wireless device, based on a similarity of the RSSI pattern;

transmitting, to the terminal, the list of wireless devices including information on the at least one second wireless device;

transmitting, to an authentication server, an authentication request message for a third wireless device; and receiving, from the authentication server, as a response to the authentication request message, an authentication response message including an authentication result of the third wireless device, wherein the information on the at least one wireless device associated with the neighboring AP is received from the neighboring AP, wherein authentication information of the terminal includes user authentication information of the terminal, wherein identification information of the third wireless device includes at least one of a media access control (MAC) address of the third wireless device, a name of the third wireless device, or a type of the third wireless device, and wherein the terminal includes a device capable of launching a web browser and executing user input, and the third wireless device includes a device accessing a wireless LAN using the terminal.

2. The method of claim 1, further comprising:
receiving, from the terminal, a request message for wireless local area network (LAN) access of a third wireless device among the at least one second wireless device;

performing an authentication procedure for the third wireless device based on the identification information of the third wireless device and the authentication information of the terminal which are included in the request message; and transmitting, to the terminal, a response message including the authentication result for the third wireless device.

3. The method of claim 1, wherein the filtering of the at least one first wireless device to identify the at least one second wireless device further comprises:
filtering the at least one first wireless device to identify the at least one second wireless device based on at least one of a time elapsed after association with the AP, a pattern of a received signal strength or an authentication history.

4. A method of a terminal in a communication system, the method comprising:
transmitting, to an access point (AP), a request message for a list of wireless devices, the terminal being authenticated by the AP;

receiving, from the AP, as a response to the request message, the list of wireless devices including information on at least one first wireless device, the information includes a received signal strength indicator (RSSI);

calculating an RSSI pattern of the at least one first wireless device based on the information on at least one first wireless device;

selecting a second wireless device from the at least one first wireless device, based on a similarity of the RSSI pattern; and transmitting, to the AP, a request message for a wireless local area network (LAN) access of the second wireless device, wherein the information on the at least one first wireless device is obtained based on at least one of information on at least one wireless device associated with the AP or information on at least one wireless device associated with a neighboring AP, wherein authentication information of the terminal includes user authentication information of the terminal, wherein the information of the second wireless device includes at least one of a media access control (MAC) address of the second wireless device, a name of the second wireless device, or a type of the second wireless device, and wherein the terminal includes a device capable of launching a web browser and executing user input, and the second wireless device includes a device accessing a wireless LAN using the terminal.

5. The method of claim 4, further comprising:
receiving, from the AP, a response message including an authentication result for the second wireless device;

wherein the authentication information of the terminal and information of the second wireless device included in the request message for the wireless LAN access are used in an authentication procedure of the second wireless device.

6. The method of claim 4, wherein the at least one first wireless device is filtered based on at least one of a time elapsed after association with the AP, a pattern of a received signal strength, or an authentication history.

7. An access point (AP) in a communication system, the AP comprising:
a transceiver; and
a controller configured to:
obtain information on at least one first wireless device, based on at least one of information on at least one wireless device associated with the AP or information on at least one wireless device associated with a neighboring AP, the information on the at least one wireless device associated with the neighboring AP includes a received signal strength indicator (RSSI), receive, from a terminal, a request message for a list of wireless devices, the terminal being authenticated by the AP, calculate an RSSI pattern of the at least one first wireless device based on the information on the at least one first wireless device, as a response to the request message, filter the at least one first wireless device to identify at least one second wireless device, based on a similarity of the RSSI pattern, transmit, to the terminal, the list of wireless devices including information on the at least one second wireless device, transmit, to an authentication server, an authentication request message for a third wireless device, receive, from the authentication server, as a response to the authentication request message, an authentication response message including an authentication result of the third wireless device, wherein the information on the at least one wireless device associated with the neighboring AP is received from the neighboring AP, wherein authentication information of the terminal includes user authentication information of the terminal, wherein identification information of the third wireless device includes at least one of a media access control (MAC) address of the third wireless device, a name of the third wireless device, or a type of the third wireless device, and wherein the terminal includes a device capable of launching a web browser and executing user input, and the third wireless device includes a device accessing a wireless LAN using the terminal.

8. The AP of claim 7, wherein the controller is configured to:

receive, from the terminal, a request message for a wireless local area network (LAN) access of a third wireless device among the at least one second wireless device, perform an authentication procedure for the third wireless device based on the identification information of the third wireless device and the authentication information of the terminal which are included in the request message for the wireless LAN access, and transmit, to the terminal, a response message including the authentication result for the third wireless device.

9. The AP of claim 7, wherein the controller is configured to:

filter the at least one first wireless device to identify the at least one second wireless device based on at least one of a time elapsed after association with the AP, a pattern of a received signal strength, or an authentication history.

10. A terminal in a communication system, comprising:
a transceiver; and
a controller configured to:

transmit, to an access point (AP), a request message for a list of wireless devices, the terminal being authenticated by the AP, receive, from the AP, as a response to the request message, the list of wireless devices including information on at least one first wireless device, the information includes a received signal strength indicator (RSSI), calculate an RSSI pattern of the at least one first wireless device based on the information on at least one first wireless device, select a second wireless device from the at least one first wireless device, based on a similarity of the RSSI pattern, and transmit, to the AP, a request message for a wireless local area network (LAN) access of the second wireless device, wherein the information on the at least one first wireless device is obtained based on at least one of information on at least one wireless device associated with the AP or information on at least one wireless device associated with a neighboring AP, wherein authentication information of the terminal includes user authentication information of the terminal, wherein the information of the second wireless device includes at least one of a media access control (MAC) address of the second wireless device, a name of the second wireless device, or a type of the second wireless device, and wherein the terminal includes a device capable of launching a web browser and executing user input and the second wireless device includes a device accessing a wireless LAN using the terminal.

11. The terminal of claim 10, wherein the controller is configured to:

receive, from the AP, a response message including an authentication result for the second wireless device, wherein the authentication information of the terminal and information of the second wireless device included in the request message are used in an authentication procedure of the second wireless device, and wherein the at least one first wireless device is filtered based on at least one of a time elapsed after association with the AP, a pattern of a received signal strength, or an authentication history.

\* \* \* \* \*